US011108440B2

(12) United States Patent
Cha et al.

(10) Patent No.: US 11,108,440 B2
(45) Date of Patent: Aug. 31, 2021

(54) METHOD AND APPARATUS FOR TRANSMITTING OR RECEIVING REFERENCE SIGNAL IN WIRELESS COMMUNICATION SYSTEM

(71) Applicant: LG ELECTRONICS INC., Seoul (KR)

(72) Inventors: Hyunsu Cha, Seoul (KR); Kijun Kim, Seoul (KR); Jonghyun Park, Seoul (KR); Haewook Park, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/636,321

(22) PCT Filed: Aug. 3, 2018

(86) PCT No.: PCT/KR2018/008850
§ 371 (c)(1),
(2) Date: Feb. 3, 2020

(87) PCT Pub. No.: WO2019/027289
PCT Pub. Date: Feb. 7, 2019

(65) Prior Publication Data
US 2020/0220583 A1 Jul. 9, 2020

Related U.S. Application Data

(60) Provisional application No. 62/540,588, filed on Aug. 3, 2017.

(51) Int. Cl.
*H04W 4/00* (2018.01)
*H04B 7/0408* (2017.01)
(Continued)

(52) U.S. Cl.
CPC ......... *H04B 7/0408* (2013.01); *H04B 7/0626* (2013.01); *H04B 17/336* (2015.01); *H04L 5/0051* (2013.01); *H04W 80/08* (2013.01)

(58) Field of Classification Search
CPC .. H04B 17/336; H04B 7/0408; H04B 7/0626; H04B 7/0695; H04L 5/0051; H04L 5/0094; H04W 52/325; H04W 80/08
See application file for complete search history.

(56) References Cited

U.S. PATENT DOCUMENTS

2016/0080052 A1* 3/2016 Li ..................... H04B 7/0632
375/267
2019/0089435 A1* 3/2019 Mondal ................ H04B 7/088

FOREIGN PATENT DOCUMENTS

WO 2014210493 12/2014
WO 2015020505 2/2015

OTHER PUBLICATIONS

Huawei et al., "CSI-RS Design in NR", R1-1709946, 3GPP TSG RAN WG1 NR Ad Hoc Meeting, Jun. 2017, 8 pages.
(Continued)

*Primary Examiner* — Minh Trang T Nguyen
(74) *Attorney, Agent, or Firm* — Lee Hong Degerman Kang & Waimey

(57) ABSTRACT

The present invention relates to a method and an apparatus for performing beam management by a terminal in a wireless communication system. The present invention may provide a method and an apparatus in which a terminal receives, from a base station, configuration information of channel state information (CSI)-RS, and receives the CSI-RS on the basis of the configuration information, wherein the CSI-RS is transmitted through a plurality of antenna ports, and the terminal configures a beam of each of the plurality of antenna ports on the basis of the CSI-RS, wherein the CSI-RS is mapped to subcarriers on a frequency (Continued)

axis at an interval of predetermined number of resource elements (REs), and the CSI-RS is repeatedly transmitted according to the interval of the predetermined number of REs within a specific time period.

9 Claims, 19 Drawing Sheets

(51) Int. Cl.
    *H04B 17/336*     (2015.01)
    *H04B 7/06*     (2006.01)
    *H04L 5/00*     (2006.01)
    *H04W 80/08*     (2009.01)

(56) References Cited

OTHER PUBLICATIONS

LG Electronics, "On CSI-RS Design for Beam Management", R101710292, 3GPP TSG RAN WG1 Meeting Ad-Hoc#2, Jun. 2017, 7 pages.
Vivo, "On CSI-RS Design for Beam Management", R1-1710401, 3GPP TSG RAN WG1 Meeting NR Ad-Hoc #2, Jun. 2017, 7 pages.
PCT International Application No. PCT/KR2018/008850, International Search Report dated Dec. 7, 2018, 6 pages.

\* cited by examiner (a)

(b)

METHOD AND APPARATUS FOR TRANSMITTING OR RECEIVING REFERENCE SIGNAL IN WIRELESS COMMUNICATION SYSTEM

CROSS-REFERENCE TO RELATED APPLICATION(S)

This application is the National Stage filing under 35 U.S.C. 371 of International Application No. PCT/KR2018/008850, filed on Aug. 3, 2018, which claims the benefit of U.S. Provisional Application No. 62/540,588 filed on Aug. 3, 2017, the contents of which are all hereby incorporated by reference herein in their entirety.

TECHNICAL FIELD

The present disclosure relates to a wireless communication system, and more particularly, to a method and an apparatus for determining transmission power for transmitting a demodulation reference signal in a wireless communication system.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure has been made in an effort to provide a method and an apparatus for transmitting or receiving a Demodulation Reference Signal (DMRS) in a wireless communication system.

Furthermore, the present disclosure has been made in an effort to provide a method and an apparatus for mapping a Demodulation Reference Signal (DMRS) to a resource element (RE) in a wireless communication system.

Furthermore, the present disclosure has been made in an effort to provide a method and an apparatus for determining transmission power for transmitting a Demodulation Reference Signal (DMRS) mapped to a resource element.

Furthermore, the present disclosure has been made in an effort to provide a method and an apparatus for multiplexing antenna ports for transmitting a Demodulation Reference Signal (DMRS).

Furthermore, the present disclosure has been made in an effort to provide a method and an apparatus for transmitting a Demodulation Reference Signal (DMRS), and downlink data and other reference signals together.

Furthermore, the present disclosure has been made in an effort to provide a method and an apparatus for considering a mapping pattern of a Demodulation Reference Signal (DMRS), other reference signals, and downlink data in determining transmission power for transmitting the Demodulation Reference Signal (DMRS).

The technical objects of the present disclosure are not limited to the aforementioned technical objects, and other technical objects, which are not mentioned above, will be apparently appreciated by a person having ordinary skill in the art from the following description.

Technical Solution

In order to solve the technical problem, provided is a beam management method in a wireless communication system according to an embodiment of the present disclosure.

Advantageous Effects

According to an embodiment of the present disclosure, downlink data and a DMRS can be simultaneously transmitted according to a symbol of a slot associated with transmission of data.

Furthermore, according to an embodiment of the present disclosure, when a size of a resource to transmit the downlink data is large, the downlink data and the DMRS are not simultaneously transmitted, thereby boosting transmission power of the DMRS.

Furthermore, according to an embodiment of the present disclosure, a magnitude of power boosting of the DMRS is adjusted according to the number of groups of antenna ports to which a DMRS not transmitted together with data is mapped, thereby efficiently determining the transmission power of the DMRS.

Furthermore, according to an embodiment of the present disclosure, other reference signals or data are not mapped to the symbol to which the DMRS is mapped according to a mapping pattern in which the DMRS is mapped an RE to efficiently perform power boosting of the DMRS.

Furthermore, according to an embodiment of the present disclosure, a multiplexing method of the antenna ports in which the DMRS is transmitted according to the mapping pattern of the DMRS can be determined.

Advantages which can be obtained in the present disclosure are not limited to the aforementioned advantages and other unmentioned advantages will be clearly understood by those skilled in the art from the following description.

DESCRIPTION OF DRAWINGS

In order to help understanding of the present disclosure, the accompanying drawings which are included as a part of the Detailed Description provide embodiments of the present disclosure and describe the technical features of the present disclosure together with the Detailed Description.

MODE FOR INVENTION

Figure 1:
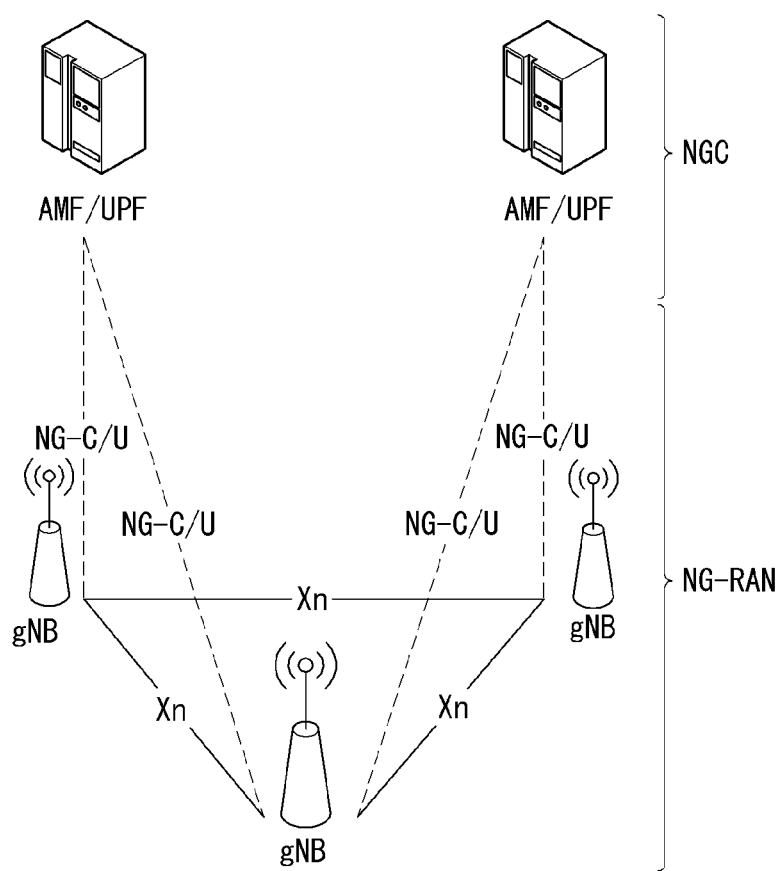
FIG. 1 is a diagram illustrating an example of an overall structure of a new radio (NR) system to which a method proposed by the present disclosure may be implemented.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Further, 5G new radio (NR) defines Enhanced Mobile Broadband (eMBB), Massive Machine Type Communications (mMTC), Ultra-Reliable and Low Latency Communications (URLLC), and vehicle-to-everything (V2X) according to a usage scenario.

In addition, the 5G NR standard is divided into standalone (SA) and non-standalone (NSA) depending on co-existence between the NR system and the LTE system.

In addition, the 5G NR supports various subcarrier spacings, and supports CP-OFDM in the downlink and CF-OFDM and DFT-s-OFDM (SC-OFDM) in the uplink.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and frame structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
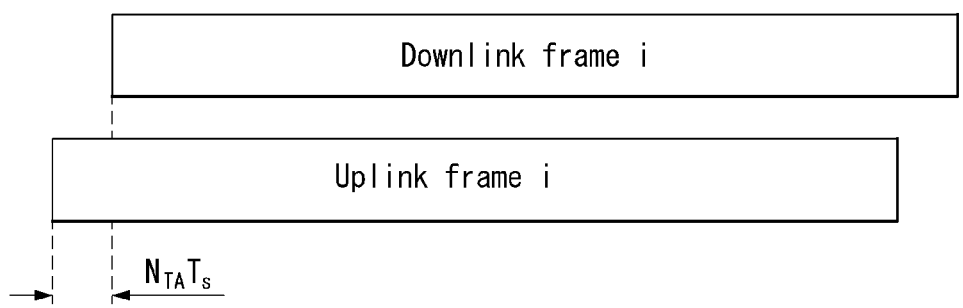
FIG. 2 illustrates a relationship between a UL frame and a DL frame in a wireless communication system to which a method proposed by the present disclosure may be implemented.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $N_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
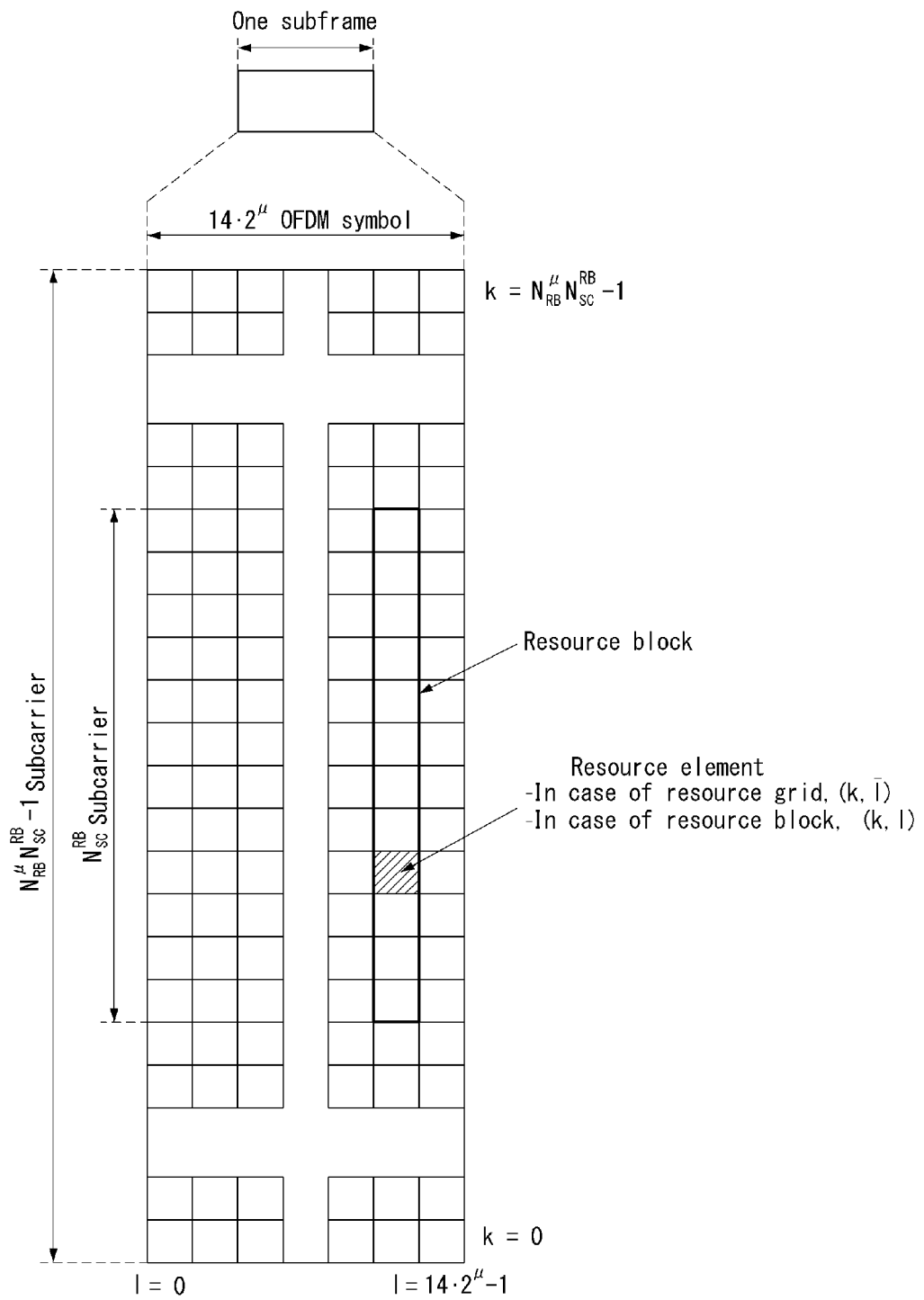
FIG. 3 illustrates an example of a resource grid supported in a wireless communication system to which a method proposed by the present disclosure may be implemented.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of $14 \cdot 2\mu$ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, Herein, $N_{RB}^{\mu} \leq N_{RB}^{max, \mu}$. The above $N_{RB}^{max, \mu}$ indicates the maximum transmission bandwidth, and it may change not just between numerologies, but between UL and DL.

In this case, as illustrated in FIG. 3, one resource grid may be configured for the numerology $\mu$ and an antenna port p.

Each element of the resource grid for the numerology $\mu$ and the antenna port p is indicated as a resource element, and may be uniquely identified by an index pair (k,l̄) Herein, k=0, . . . , $N_{RB}^{\mu} N_{sc}^{RB}-1$ is an index in the frequency domain, and l̄=0, . . . , $2^{\mu} N_{symb}^{(\mu)}-1$ indicates a location of a symbol in a subframe. To indicate a resource element in a slot, the index pair (k,l) is used. Herein, l=0, . . . , $N_{symb}^{\mu}-1$.

The resource element (k,l̄) for the numerology $\mu$ and the antenna port p corresponds to a complex value $a_{k,\bar{l}}^{(p,\mu)}$. When there is no risk of confusion or when a specific antenna port or numerology is specified, the indexes p and $\mu$ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

Figure 4:
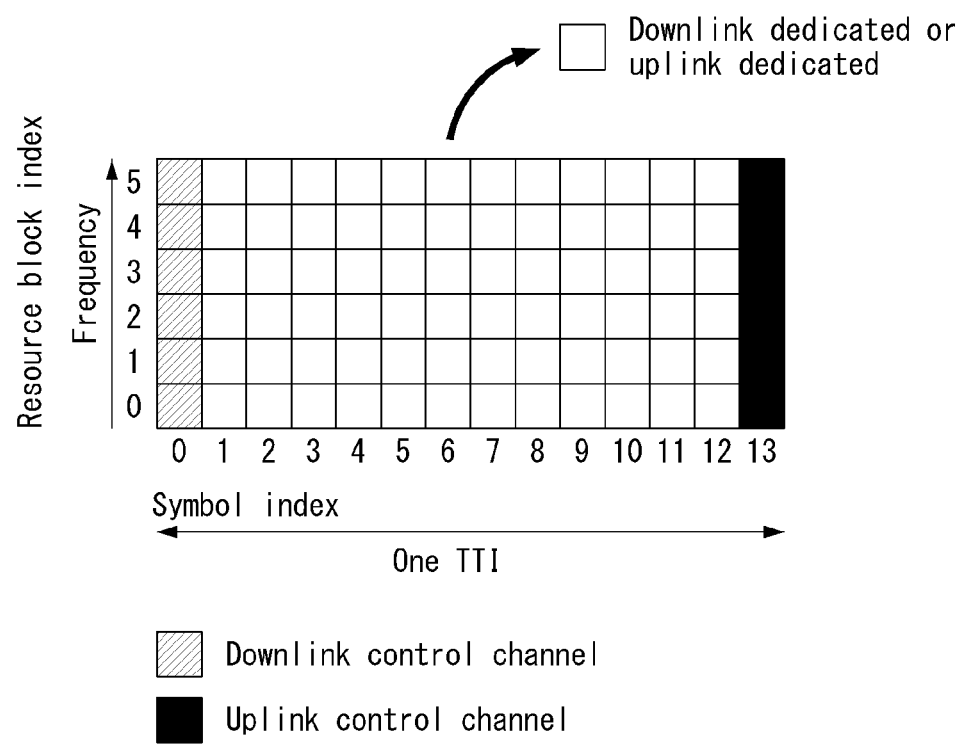
FIG. 4 is a diagram illustrating an example of a self-contained subframe structure in a wireless communication system to which the present disclosure may be implemented.

FIG. 4 is a diagram illustrating an example of a self-contained subframe structure in a wireless communication system to which the present disclosure may be implemented.

In order to minimize data transmission latency in a TDD system, 5G new RAT considers a self-contained subframe structure as shown in FIG. 4.

In FIG. 4, a diagonal line area (symbol index 0) represents a UL control area, and a black area (symbol index 13) represents a UL control area. A non0shade area may be used for DL data transmission or for UL data transmission. This structure is characterized in that DL transmission and UL transmission are performed sequentially in one subframe and therefore transmission of DL data and reception of UL ACK/NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

Figure 5:
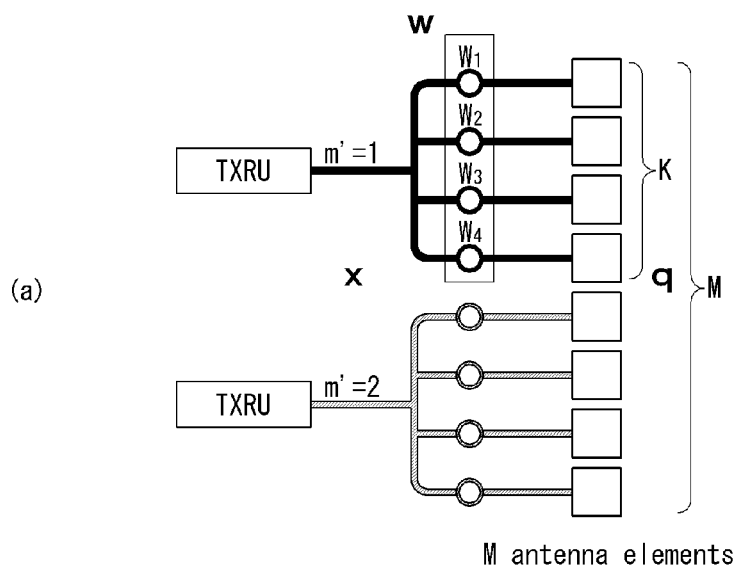
FIG. 5 is an example of a transceiver unit model in a wireless communication system to which the present disclosure may be implemented.
Figure 5:
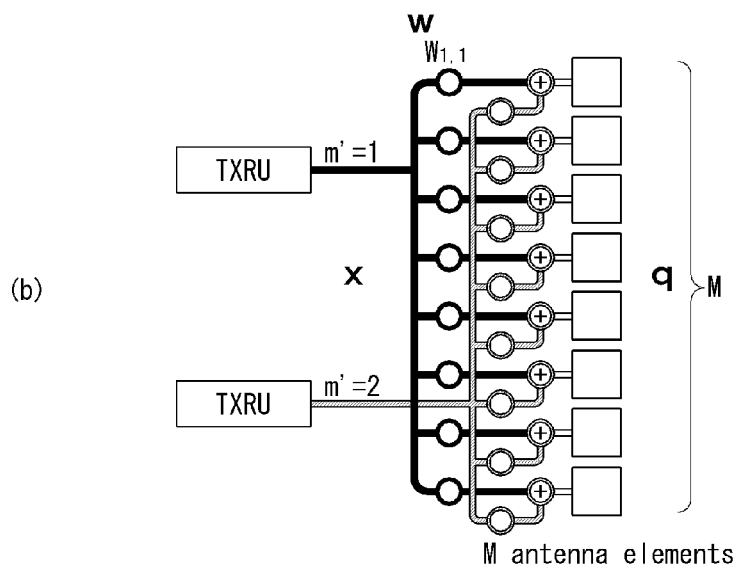

FIG. 5 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 5(a), or as a TXRU virtualization model option-2: full-connection model.

Referring to FIG. 5(a), in the sub-array partition model, the antenna elements are divided into multiple antenna element groups, and each TXRU may be connected to one of the multiple antenna element groups. In this case, the antenna elements are connected to only one TXRU.

Referring to FIG. 5(b), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 5, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIG. 5 is merely an example, and the present disclosure is not limited thereto and may be equivalently applied even to mapping of TXRUs and antenna elements which can be implemented in a variety of hardware forms.

Further, in a New RAT system, when multiple antennas are used, a hybrid beam forming technique combining digital beam forming and analog beam forming is emerging. In this case, the analog beamforming (or radio frequency (RF) beamforming) means an operation of performing precoding (or combining) in an RF stage. In the hybrid beamforming, each of a baseband stage and the RF stage perform precoding (or combining), thereby reducing the number of RF chains and the number of digital (D)/analog (A) converters and achieving performance close to the digital beamforming. For convenience, the hybrid beamforming structure may be represented by N transceiver units (TXRU) and M physical antennas. Then, the digital beamforming for L data layers to be transmitted by the transmitter may be represented by an N by L matrix, and then the N digital signals converted are converted into an analog signal via the TXRU and then applied the analog beamforming represented by an M by N matrix.

Figure 6:
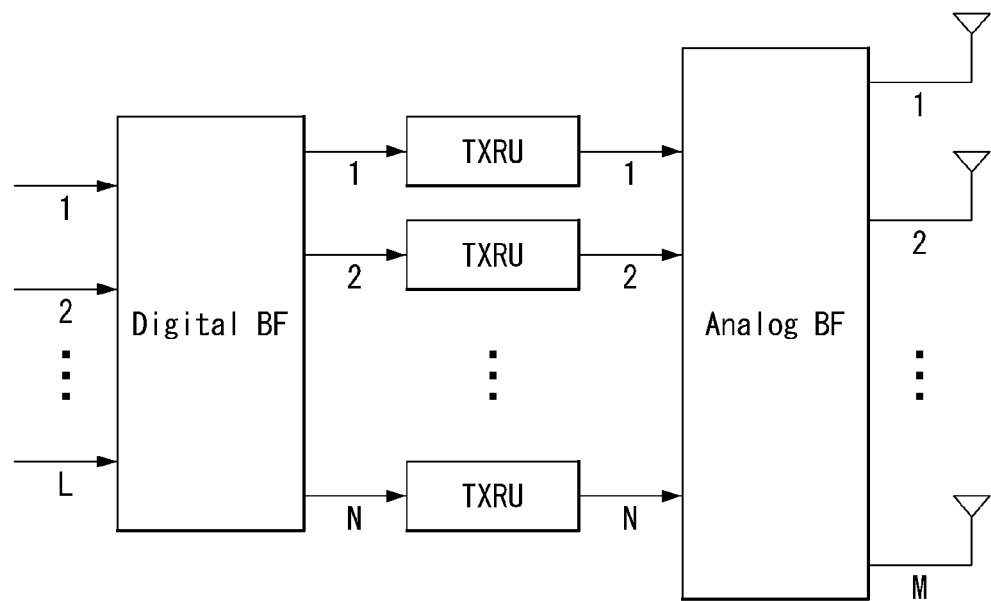
FIG. 6 is a diagram illustrating a hybrid beamforming structure in terms of TXRU and a physical antenna in the wireless communication system to which the method proposed in the present specification may be applied.

FIG. 6 is a diagram illustrating a hybrid beamforming structure in terms of TXRU and a physical antenna in the wireless communication system to which the method proposed in the present specification may be applied.

In FIG. 6, a case where the number of digital beams is L and the number of analog beams is N is illustrated.

In the New RAT system, considered is a direction in which it is designed so that the BS may change the analog beamforming by the unit of the symbol to support more efficient beamforming to a UE positioned in a specific region. Furthermore, in FIG. 6, when N specific TXRUs and M specific RF antennas are defined as one antenna panel, a scheme that introduces a plurality of antenna panels capable of independent hybrid beamforming is also considered in the New RAT system.

Feedback of Channel State Information (CSI)

In a 3GPP LTE/LTE-A system, user equipment (UE) is defined to report channel state information (CSI) to a base station (BS or eNB).

The CSI collectively refers to information that can indicate the quality of a radio channel (or referred to as a link) formed between the UE and the antenna port. For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that can be obtained when the BS uses the PMI.

In the 3GPP LTE/LTE-A system, the BS configures a plurality of CSI processes to the UE and may receive CSI for each process. Here, the CSI process is constituted by a CSI-RS for signal quality measurement from the BS and a CSI-interference measurement (CSI-IM) resource for interference measurement.

Virtualization of Reference Signal (RS)

In the mmW, it is possible to transmit a PDSCH only in one analog beam direction at a time by analog beamforming. In this case, data transmission from the BS is possible only to a small number of UEs in the corresponding direction. Therefore, if necessary, the analog beam direction is differently configured for each antenna port so that data transmission can be simultaneously performed to a plurality of UEs in several analog beam directions.

Figure 7:
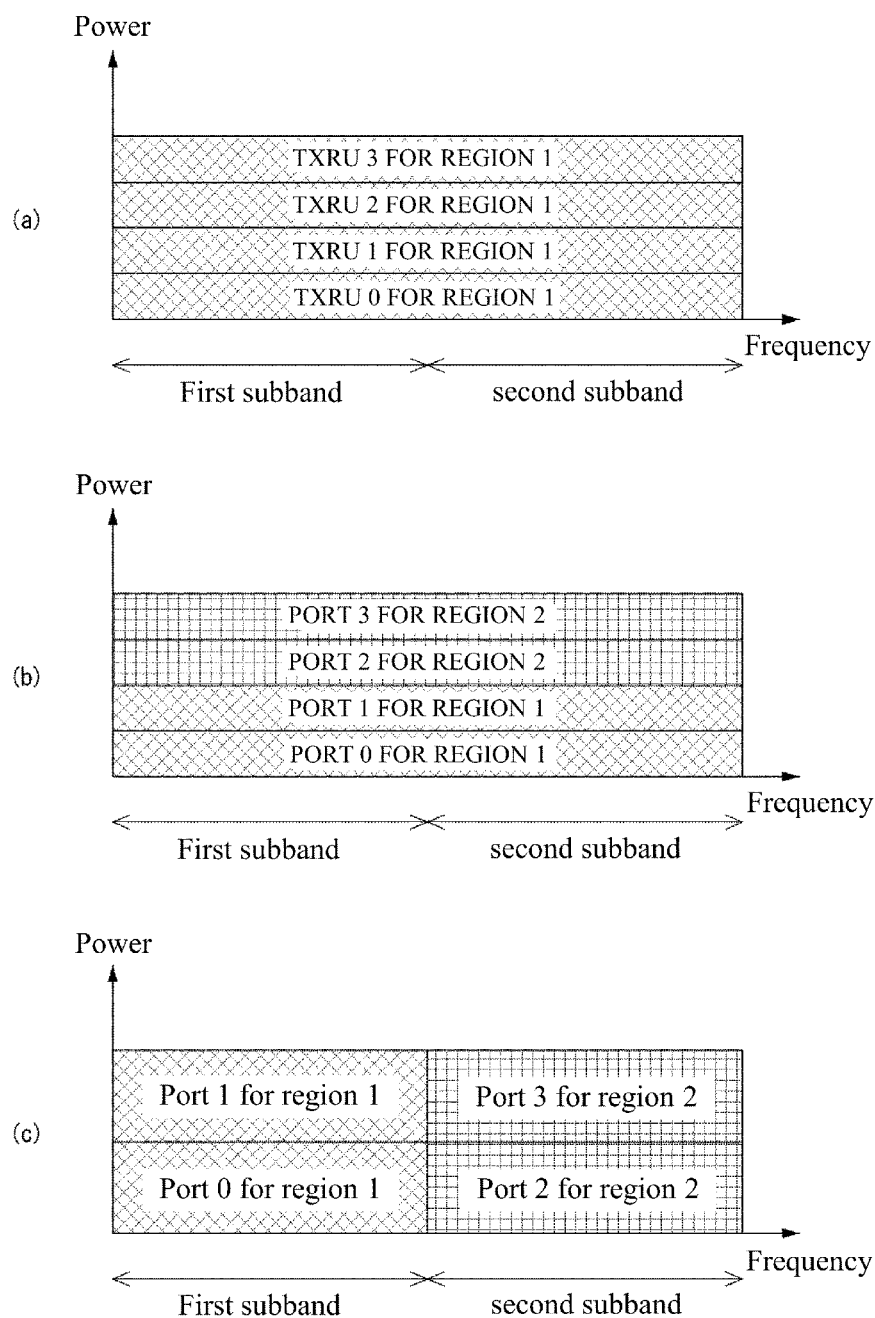
FIG. 7 is a diagram illustrating a service region for each transceiver unit in the wireless communication system to which the present disclosure may be applied.

FIG. 7 is a diagram illustrating a service region for each transceiver unit in the wireless communication system to which the present disclosure may be applied.

In FIG. 7, 256 antenna elements are divided into 4 parts to form a 4 sub-arrays, and the structure of connecting the TXRU to the sub-array will be described as an example as illustrated in FIG. 5 above.

When each sub-array is constituted by a total of 64 (8×8) antenna elements in the form of a 2-dimensional array, specific analog beamforming may cover a region corresponding to a 15-degree horizontal angle region and a 15-degree vertical angle region. That is, the zone where the BS should be served is divided into a plurality of regions, and services are provided one by one at a time.

In the following description, it is assumed that the CSI-RS antenna ports and the TXRUs are 1-to-1 mapped. Therefore, the antenna port and the TXRU have the same meaning as the following description.

As illustrated in FIG. 7(a), if all TXRUs (antenna ports, sub-arrays) (that is, TXRU 0, 1, 2, 3) have the same analog beamforming direction (that is, region 1), the throughput of the corresponding zone may be increased by forming digital beam with higher resolution. Also, it is possible to increase the throughput of the corresponding zone by increasing the rank of the transmission data to the corresponding zone.

As illustrated in FIGS. 7(b) and 7(c), if each TXRU (antenna port, sub-array) (that is, port 0, 1, 2, 3) has a different analog beamforming direction (that is, region 1 or region 2, the data can be transmitted simultaneously to UEs distributed in a wider region in the subframe (SF).

As an example shown in FIGS. 7(b) and 7(c), two of the four antenna ports are used for PDSCH transmission to UE1 in region 1 and the remaining two antenna ports are used for PDSCH transmission to UE2 in region 2.

In particular, in FIG. 7(b), PDSCH1 transmitted to UE1 and PDSCH2 transmitted to UE2 represent examples of spatial division multiplexing (SDM). Unlike this, as illustrated in FIG. 7(c), PDSCH1 transmitted to UE1 and PDSCH2 transmitted to UE2 may also be frequency division multiplexed (FDMed) and transmitted.

Among a scheme of servicing one region using all the antenna ports and a scheme of servicing many regions at the same time by dividing the antenna ports, a preferred scheme is changed according to the rank and the modulation and coding scheme (MCS) servicing to the UE for maximizing the cell throughput. Further, the preferred scheme may be changed according to the amount of data to be transmitted to each UE.

The BS calculates a cell throughput or scheduling metric which may be obtained when one region is serviced using all the antenna ports, and calculates the cell throughput or scheduling metric which may be obtained when two regions are serviced by dividing the antenna ports. The BS compares the cell throughput or the scheduling metric which may be obtained by each scheme to select the final transmission scheme. As a result, the number of antenna ports participating in PDSCH transmission may be changed by SF-by-SF. In order for the BS to calculate the transmission MCS of the PDSCH according to the number of antenna ports and reflect the calculated transmission MCS to a scheduling algorithm, the CSI feedback from the appropriate UE is required.

Figure 8:
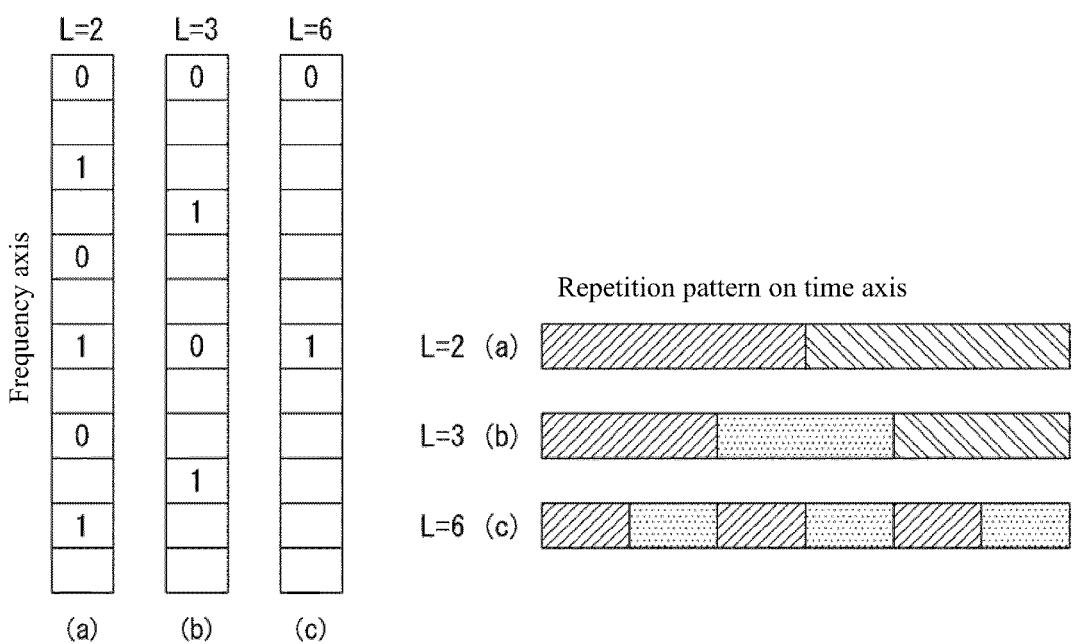
FIG. 8 is a diagram illustrating IFDMA to which a method proposed in the present disclosure may be applied.

FIG. 8 is a diagram illustrating IFDMA to which a method proposed in the present disclosure may be applied.

FIG. 8 illustrates one example of an IFDMA technique capable of several sub-time unit in one time unit (hereinafter, referred to as one OFDM symbol).

The IFDMA which is an abbreviation of Interleaved Frequency Division Multiple Access shows a feature that a signal is repeated at a predetermined period on a time axis as a method for transmitting information using only a frequency resource (hereinafter, subcarrier) spaced at a predetermined interval on a frequency axis.

For example, as illustrated in FIG. 8, when the size of Discrete Fourier Transform (DFT) is 12 and each subcarrier spacing is 2, 3, or 6, a pattern is shown in which the signal is repeatedly transmitted according to the subcarrier spacing on the time axis.

In other words, (a) in a case where the subcarrier spacing on the frequency axis is 2, the signal is transmitted on the time axis repeatedly twice, (b) in a case where the subcarrier spacing is 3, the signal is transmitted on the time axis repeatedly three times, and (c) in a case where the subcarrier spacing is 6, the signal is transmitted on the time axis repeatedly six times.

In FIG. 8, '1' and '0' mean different CSI-RS antenna ports.

Hereinafter, overall NR CSI-RS will be described in brief.

Since the CSI-RS supports beam management for the NR, an analog beamforming aspect should be considered in a CSI-RS design.

Design requirements of the CSI-RS for beam management may be different from those of a CSI-RS for CSI acquisition in aspects of a port number, a time/frequency density, a port multiplexing method, etc.

Accordingly, the CSI-RS design needs to be optimized for the beam management and the CSI acquisition while maintaining a commonality between two CSI-RS types such as a CSI-RS RE location.

A primary purpose of the CSI-RS for the CSI acquisition is similar DL link adaptation to LTE CSI-RS and the primary purpose of another type of CSI-RS is DL Tx/Rx beam management not particularly requiring measurement accuracy for link adaptation.

Accordingly, the CSI-RS for the beam management may be more sparse than the CSI-RS for acquiring the CSI in terms of a frequency density.

However, the CSI-RS for the beam management may need to support transmission of more RSs in a slot in order to permit measurement of a large set of a premise of {Tx beam, Rx beam}.

From the viewpoint of a unified CSI-RS design considering two purposes, all CSI-RS types may be included in the CSI-RS resource configuration and separate reporting configurations may be individually connected for CSI reporting and beam reporting.

The NR should consider independent optimization of two types of NZP CSI-RSs.

CSI-RS type A: primarily for DL CSI acquisition
CSI-RS type B: primarily for DL beam management
CSI-RS for Beam Management Beam selection may be performed based on a comparison of receive powers (e.g., RSRP, etc.) of different CSI-RSs.

In order to minimize RS overhead, a single measurement wise comparison may be required. In other words, each beam may correspond to one CSI-RS port. In an X-pol antenna, the signal may be transmitted only in one pol or transmitted in two pols, but may be virtualized with one port.

Accordingly, in the present disclosure, it is assumed that in order to minimize the RS overhead, each beam corresponds to one CSI-RS port.

In the case of CSI-RS type B, the sub type unit may be configured to be equal to or smaller than one OFDM symbol in reference numerology. Since the UE should be able to switch the beam or measure a beam quality in units of the sub-time unit, hardware performance of the UE, such as a beam switching standby time, an AGC saturation time, a processing time, etc., may be considered.

If the sub-time unit is configurable, a minimum value for the sub-time unit may be determined according to UE performance. For example, the sub-time unit may be fixed to one OFDM symbol in the case of lower-end UE.

With respect to periodic CSI-RS based UE group common beam management, two or more UEs may share the CSI-RS resource in order to select Tx and Rx beams thereof. In the case of this type of CSI-RS, the sub-time unit may be configured based on UE having lowest performance.

Accordingly, for the shared and periodic CSI-RSs, it may be regarded that a sub-time unit of one OFDM symbol length is used and for a UE specific aperiodic/semi-persistent CSI-RS, it may be regarded that a sub-time unit smaller than one OFDM symbol is used.

In other words, a support range of the sub-time unit may vary depending on the performance of the UE as follows.
   low-end UE: the sub-time unit is equal to the OFDM
      symbol
   high-end UE: the sub-time unit is configured to a value
      smaller than the OFDM symbol Table 4 below is a table showing one example of an antenna port for transmission of a CSI-RS for a density of resource elements (REs) to which the CSI-RS is mapped.

TABLE 4

| | Density (D = 1) [RE/PRB/Port] | Density (D = 2) [RE/PRB/Port] | Density (D = 3) [RE/PRB/Port] | Density (D = 1/2) [RE/PRB/Port] |
|---|---|---|---|---|
| X = 2 | A | | B | C |
| X = 4 | D | | E | F |

In Table 4, 'X' represents the number of antenna ports and D represents the density of the resource elements.

Hereinafter, CSI-RS port multiplexing for the CSI acquisition and beam management through the CSI-RS, transmission/reception signaling for the CSI-RS port multiplexing, and operations of the BS and the UE will be described.

The BS may announce to the UE inform for which purpose the CSI-RS transmitted to the UE through the antenna port is used through the higher layer signaling.

In other words, the BS transmits to the UE the CSI-RS configuration information of the higher layer signaling to announce whether the CSI-RS is used for the CSI acquisition or beam management.

In this case, the CSI-RS configuration information may include at least one of a CSI-RS type indicating whether the CSI-RS is used for the CSI acquisition or beam management, a Code Division Multiplexing (CDM) type depending on the purpose of the CSI-RS, a CDM length, or mapping pattern information indicating a pattern in which the CSI-RS is mapped to the RE.

When the location of an independent resource is not previously configured (appointed) between the BS and the UE at the time of configuring the CSI-RS for the CSI acquisition and beam management, the UE and the BS need to pre-appoint time resource and/or frequency unit indexes such as a specific physical resource block (PRB) index, a slot index, and/or a subframe index and recognize locations of time and frequency resources in which the CSI-RS used for the CSI acquisition and/or beam management is transmitted.

To this end, the BS may allow the UE to explicitly or implicitly recognize the location of the time resource and/or frequency resource in which the CSI-RS is transmitted through the higher layer signaling (e.g., RRC signaling).

In this case, the BS encapsulates information indicating the location of the time resource and/or frequency resource in which the CSI-RS is transmitted in the higher layer signaling to allow the UE to explicitly recognize the information.

Alternatively, a time and/or frequency resource in which the independent CSI-RS is transmitted may be allocated according to the purpose of the CSI acquisition or beam management. For example, the CSI-RS for the CSI acquisition and the CSI-RS for the beam management may be configured for two different OFDM symbols in the PRB, respectively.

Figure 9:
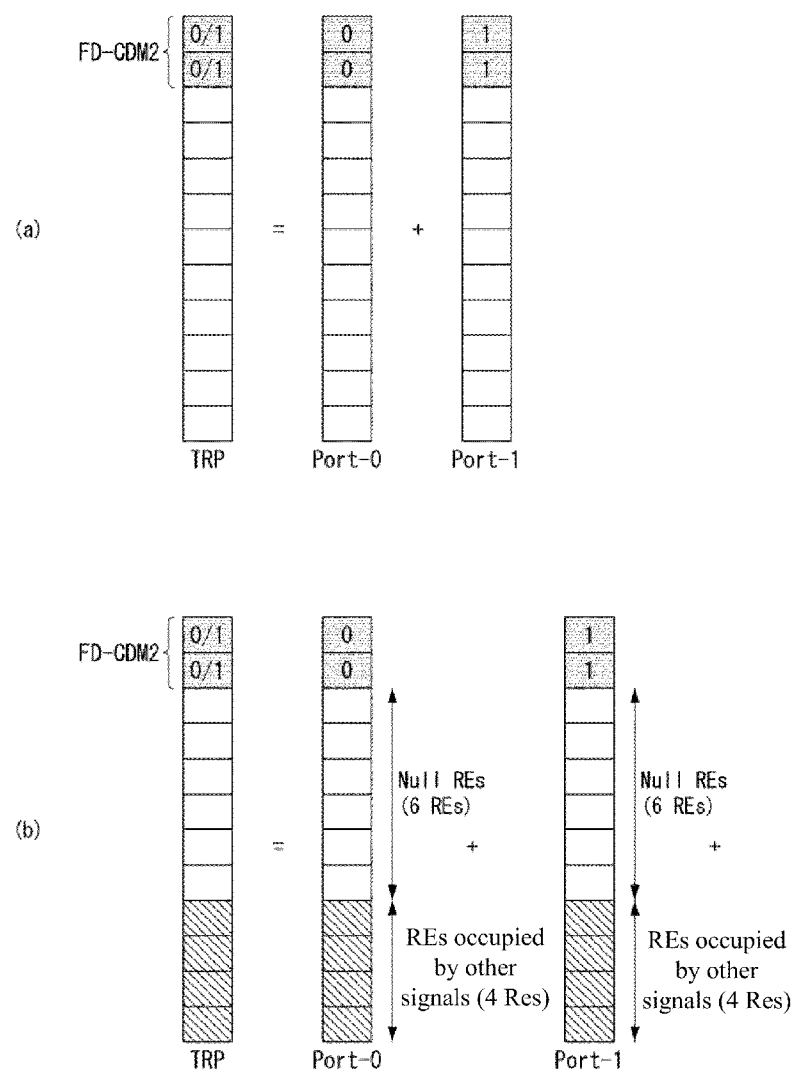
FIG. 9 is a diagram illustrating one example of a method for configuring a Channel State Information (CSI)-Reference Signal (RS) proposed in the present disclosure.

FIG. 9 is a diagram illustrating one example of a method for configuring a Channel State Information (CSI)-Reference Signal (RS) proposed in the present disclosure.

Referring to FIG. 9, when the CSI-RS is transmitted in two ports and the density of resource elements to which the CSI-RS of each antenna port per PRB is 1, the antenna ports for transmitting the CSI-RS may be multiplexed without using the CDM scheme.

Specifically, when the number of antenna ports is '2' and a value of D is '1', the antenna ports (component RE CSI RE pattern (2,1), component CSI-RS RE pattern (2,1)) mapped to two REs adjacent onto the frequency axis in the OFDM symbol may be configured in a basic pattern configuring a CSI-RS RE pattern on a time-frequency resource grid.

In other words, component CSI-RS RE pattern (2,1) represents that the number of adjacent REs in the frequency domain is 2 and the number of adjacent REs in the time domain is 1.

In this case, the antenna ports for transmitting the CSI-RS may be multiplexed through the following methods.

① The BS may configure the method for multiplexing the antenna ports for transmitting the CSI-RS by FD-CDM2 when configuring the CSI-RS for the CSI acquisition and configure the method for multiplexing the antenna ports for transmitting the CSI-RS for the beam management by FDM.

In other words, the BS may multiplex the antenna ports for transmitting the CSI-RS for the beam management using only the FDM method without using the CDM method.

In the case where the method is configured as above, when the UE is configured with the CSI-RS for the CSI acquisition from the BS, even though the UE does not know information on a CDM type and a CDM length, the UE may recognize that the antenna ports are multiplexed using an FD-CDM2 scheme.

Similarly thereto, when the UE is configured with the CSI-RS for the beam management from the BS, the UE may recognize that the antenna ports for CSI-RS transmission are multiplexed through only the FDM scheme without configuring the CDM.

Even when the CDM scheme may not be used with respect to the antenna ports for transmitting the CSI-RS for the CSI acquisition, the BS may configure the multiplexing scheme of the antenna ports for transmitting the CSI-RS for the CSI acquisition by FD-CDM2 or FDM and configure the multiplexing method of the antenna ports for the beam management by FDM.

In both two methods, the antenna ports for the CSI-RS for the beam management may be multiplexed through FDM and this method may be associated with a beam management method based on IFDMA when the mapping pattern of the CSI-RS RE is constituted by consecutive REs on the frequency axis.

In this case, when the CSI-RS is transmitted through two adjacent REs in the BS, the following problems may be present in order to perform the beam sweeping operation for the beam management based on IFDM.

First, signals transmitted from two FDMed antenna ports should be distinguished through DFT which is equal to or larger than an IFFT size used by the BS for CSI-RSs (signals transmitted from two FDMed ports) transmitted from the multiplexed antenna ports in order to perform an IFDMA based receiving beam sweeping operation.

However, when the CSI-RS is already received by one receiving beam, it is difficult for the UE to know current channel information between several receiving beams and the BS.

In other words, in order to first distinguish information of the FDMed antenna ports for transmitting the CSI-RS and then configure an IFDMA signal by the UE, channel information between the receiving beam for beam sweeping and the BS should be acquired.

However, since an operation of receiving the CSI-RS for the beam management is an operation performed before the CSI-RS for the CSI acquisition, there may not be a CSI acquisition procedure before receiving the CSI-RS for the beam management and even when there is the CSI acquisition procedure, there is a high possibility that channel information which is acquired previously will be outdated information.

In order to solve the problem, the present disclosure proposes the IFDMA based receiving beam sweeping operation when REs adjacent on the frequency axis is configured by the CSI-RS for the beam management.

When the CSI-RS for the beam management is configured, the BS may announce to the UE that the CDM is not configured through the higher layer signaling.

For example, the BS may announce to the UE that the CDM length is '0' or '1' through the higher layer signaling and the UE may recognize that the antenna ports for the CSI-RS for the beam management are not multiplexed without using the CDM scheme through the announcement.

The BS may configure the CSI-RS for the CSI acquisition or configure the multiplexing scheme of the antenna ports for transmitting the CSI-RS for the beam management based on a large subcarrier spacing by FD-CDM2 or FDM and configure a multiplexing scheme of antenna ports for transmitting the CSI-RS for IFDMA based beam management by FDM.

In this case, the reason why the configuration of the CSI-RS for the IFDMA based beam management adopts FDM, but the large subcarrier spacing based beam management method is configured by FD-CDM2 is that in the case of large subcarrier spacing, when FD-CDM2 is used, there is a larger gain in terms of power boosting and coverage.

Specifically, when the BS configures the CSI-RS for the CSI acquisition, in the case where the antenna ports are multiplexed through the FD-CDM2 scheme as illustrated in FIG. 9(*a*), a 3 dB power boosting gain may be acquired.

When different signals are not transmitted in the same OFDM symbol (e.g., another reference signal or data signal through PDSCH multiplexed with the CSI-RS) or when another signal is transmitted, but 6 REs are empty as null REs as illustrated in FIG. 9(*b*), each antenna port may increase power allocated per RE used for transmitting the CSI-RS up to a maximum of 4.

In this case, locations (locations where two adjacent subcarriers are used in the OFDM symbol) of two REs used may be changed under a condition in which two antenna ports have the same frequency offset. The location of the RE used according to the supported wireless communication system may be fixed or changed.

Figure 10:
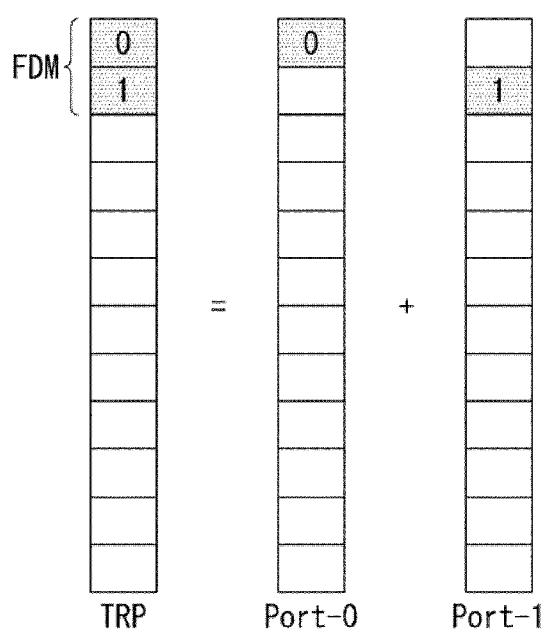
FIG. 10 is a diagram illustrating one example of a method for configuring a CSI-RS for beam management proposed in the present disclosure.

FIG. 10 is a diagram illustrating one example of a method for configuring a CSI-RS for beam management proposed in the present disclosure.

Referring to FIG. 10, when the BS configures the CSI-RS for the beam management, the BS may multiplex the antenna ports for transmitting the CSI-RS by the FDM scheme.

Specifically, when the BS configures the CSI-RS for the beam management in a specific OFDM symbol, the BS may use component CSI-RS RE pattern (2,1) from the viewpoint of a Time Resource Pattern (TRP) and configure the multiplexing method of the antenna ports by FDM.

When REs of a specific OFDM symbol are configured as the CSI-RS for the beam management, remaining REs other than the RE to which the CSI-RS is mapped are empty as null REs without multiplexing with other reference signals and/or other data signals to perform the beam sweeping operation for the beam management through the IFDMA scheme described above.

When antenna ports for 2 CSI-RSs are configured in the specific OFDM symbol as illustrated in FIG. 10, the UE may test a maximum of 6 receiving beams for each antenna port in which each CSI-RS is transmitted for the beam management.

In this case, a 6 dB power boosting gain may be acquired by allocating a power of up to four times a power allocated to a PFDSCH signal to an RE used for transmitting the CSI-RS in each antenna port.

The BS may configure to restrictively permit that other reference signals (e.g., FMRS, PTRS, TRS, etc.) and/or data signals with the OFDM symbol in which the CSI-RS for the CSI acquisition is transmitted through the FDM scheme for coverage performance and/or CSI acquisition accuracy only up to four REs and make the remaining REs become the null REs.

Figure 11:
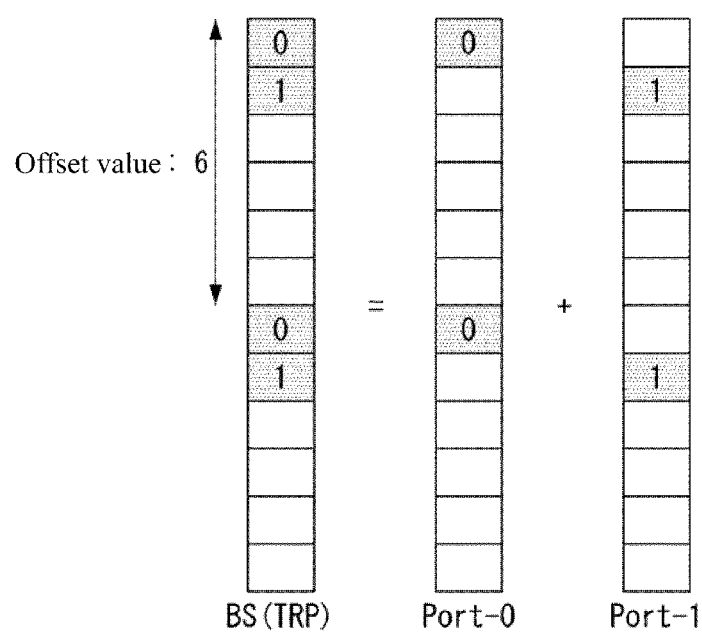
FIG. 11 is a diagram illustrating one example of a method for configuring a CSI-RS for beam management, which is transmitted through two antenna ports proposed in the present disclosure.

FIG. 11 is a diagram illustrating one example of a method for configuring a CSI-RS for beam management, which is transmitted through two antenna ports proposed in the present disclosure.

Referring to FIG. 11, each of two antenna ports for CSI-RS transmission for the CSI acquisition and the beam management may be configured twice in a specific OFDM symbol.

Specifically, when the RE density of the CSI-RS is '2', the BS may configure the multiplexing scheme of the antenna port by FDM, FD-CDM2, or FD-CDM4 in order to configure the CSI-RS for the CSI acquisition.

When the antenna ports are multiplexed using the FDM scheme, the UE and the BS may pre-appoint that the CDM length is '0' or a basic configuration value of the CDM type is not a value (e.g., No CDM mode, etc.) in which the CDM scheme is not used in order for the UE to recognize that the CDM scheme is not used and the antenna ports are multiplexed.

In this case, REs to which two (2,1) CSI-RSs constituting two CDM groups are mapped may be adjacent or not adjacent.

In order to configure the CSI-RS for beam management in which the density of the RE is 2, the BS may map a second CSI-RS of each antenna port to seventh and eighth REs in which the frequency offset value is 6 and configure 2-port CSI-RS multiplexing.

At the time of configuring the CSI-RS for the beam management, the BS may announce to the UE at least one of the CSI-RS type information indicating whether the CSI-RS transmitted through the higher layer signaling is used for the CSI acquisition or beam management, multiplexing information indicating that the antenna ports are multiplexed using the FDM scheme without using the CDM scheme, density information of the RE to which the CSI-RS is mapped, the number of antenna ports in which the CSI-RS is transmitted, or mapping patter information (component CSI-RS RE pattern (2,1)) in which the CSI-RS is mapped to the RE.

In other words, the BS may encapsulate such information in the CSI-RS configuration information of the higher layer signaling and transmit the information to the UE.

When the UE receives such information from the BS through the higher layer signaling, the UE may recognize that the CSI-RS is mapped as illustrated in FIG. 11.

If configuring a DSM scheme in which the CDM scheme is not used is not permitted for the CSI-RS for the CSI acquisition, when the BS configures the CSI-RS for the beam management, the UE may recognize that the configured CSI-RS is the CSI-RS for the beam management even though the BS does not transmit the CSI-RS type information to the UE through the higher layer signaling.

Further, the UE may recognize that the configured CSI-RS is configured in the pattern illustrated in FIG. 11.

Alternatively, if component CSI-RS RE pattern (2,1) which is mapping pattern information of the CSI-RS indicating that the CSI-RS is mapped to density '1' in two antenna ports is used only in a case where X representing the number of antenna ports is '2', when the BS configures the CSI-RS for the beam management, the UE may recognize that the configured CSI-RS is the CSI-RS for the beam management even though the BS does not transmit the mapping pattern information to the UE through the higher layer signaling.

Alternatively, in the multiplexing scheme of the CSI-RS for the CSI acquisition, when the FDM scheme is not permitted and component CSI-RS RE pattern (2,1) is permitted only in the case where X representing the number of antenna ports is '2', the BS may announce to the UE only multiplexing information, density information, and the number of antenna ports through the higher layer signaling.

In this case, even though the UE acquires only such information through the higher layer signaling, the UE may recognize the configured CSI-RS is the CSI-RS for the beam management and the configured CSI-RS is mapped as illustrated in FIG. 11.

When the CSI-RS type information is not included in the CSI-RS configuration information of the higher layer signaling, the BS may transmit to the UE the CSI-RS configuration information of the higher layer signaling including at least one of multiplexing information, a frequency offset value indicating an offset value of the RE to which the CSI-RS is mapped, the number of antenna ports, or the mapping pattern information.

When the UE receives the CSI-RS configuration information from the BS, the UE may recognize that the CSI-RS for the beam management is configured as illustrated in FIG. 11.

When the frequency offset value of the CSI-RS for the CSI acquisition is '0' and the frequency offset value of the CSI-RS for the beam management is '6', there may be the following embodiment.

When configuring the FDM scheme in which the CDM scheme is not used is not permitted for the CSI-RS for acquisition and the CSI-RS for the beam management is continuously multiplexed only through the FDM scheme, the CSI-RS configuration information may not include the multiplexing information.

Alternatively, when component CSI-RS RE pattern (2,1) is used only in the case where X representing the number of antenna ports is '2', the configuration information may not include the mapping pattern information.

Alternatively, in the multiplexing scheme of the CSI-RS for the CSI acquisition, when the FDM scheme is not permitted and component CSI-RS RE pattern (2,1) is permitted only in the case where X representing the number of antenna ports is '2', the CIS-RS configuration information may include only the frequency offset value and the number of antenna ports.

As another example of the present disclosure, in the UE and the BS, a rule in which the antenna ports are mapped to two REs may be preconfigured.

For example, in the UE and the BS, a mapping rule may be preconfigured in which the antenna ports are mapped to two REs in an ascending order or a descending order of the subcarrier in respect to an antenna port number.

In this case, the UE may recognize that the CSI-RS is mapped as illustrated in FIG. 11 based on the CSI-RS configuration information of the higher layer signaling transmitted from the BS and perform the beam management by performing the beam sweeping operation through a maximum of 6 beams.

In this case, the CSI-RS configuration information may include the number of antenna ports transmitting the CSI-RS, the mapping pattern information, and the multiplexing information.

Consequently, as illustrated in FIG. 11, the CSI-RS may be configured in a form in which the frequency offset value is '0' and a comb value is 6 in port 0 and the CSI-RS may be configured in a form in which the frequency offset value is '1' and the comb value is 6 in port 1.

In this case, when the IFDMA is used, the comb value may represent the number of repeated signals.

In other words, the comb value may represent an interval of REs to which a CSI-RS of a specific antenna port is mapped.

Figure 12:
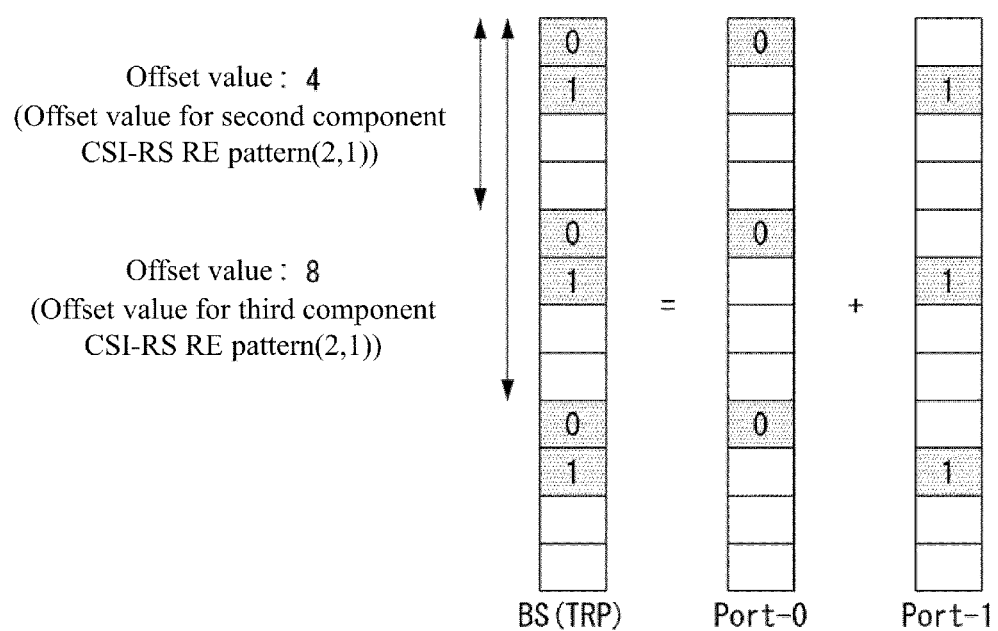
FIG. 12 is a diagram illustrating another example of a method for configuring a CSI-RS for beam management, which is transmitted through two antenna ports proposed in the present disclosure.

FIG. 12 is a diagram illustrating another example of a method for configuring a CSI-RS for beam management, which is transmitted through two antenna ports proposed in the present disclosure.

Referring to FIG. 12, each of two antenna ports for CSI-RS transmission for the CSI acquisition and the beam management may be configured three times in a specific OFDM symbol.

Specifically, when the CSI-RS for the beam management is mapped to the RE, the BS may be configured to perform FDM based port multiplexing using three component CSI-RS RE pattern (2,1) as illustrated in FIG. 12.

The BS may announce that multiplexing of the antenna port is performed using the FDM scheme through the higher layer signaling.

For example, when a higher layer parameter (e.g., CDM length) indicating the length of the CDM is configured in the higher layer signaling in the BS, the UE may recognize a scheme in which antenna ports for CSI-RS transmission are multiplexed.

In this case, the higher layer signaling may include CSI-RS type information, density information, and the number of antenna ports transmitting the CSI-RS.

When the UE receives the higher layer signaling of the BS, the UE may recognize the mapping pattern of the CSI-RS based on the information included in the higher layer signaling.

When the CSI-RS type information is not included in the higher layer signaling, the higher layer signaling may include the number of antenna ports transmitting the CSI-RS and the frequency offset value of the mapping pattern in which the CSI-RS is mapped to the RE.

When two or three frequency offset values are '0', the CSI-RS may be configured for the CSI acquisition or beam management.

In this case, the UE may perform the beam sweeping operation for the beam management using two beams.

In other words, an optimum beam for receiving the signal transmitted from the BS may be selected based on signals (e.g., CSI-RSs) transmitted in two beams, respectively.

In the case of the CSI-RS mapping pattern illustrated in FIG. 10, since 9 REs become null REs in each antenna port, a four-time power boosting (6 dB) gain may be obtained in the RE in which the CSI-RS for the beam management is transmitted.

Further, since the density is 3, a total of 12-time power boosting gain may be acquired.

Figure 13:
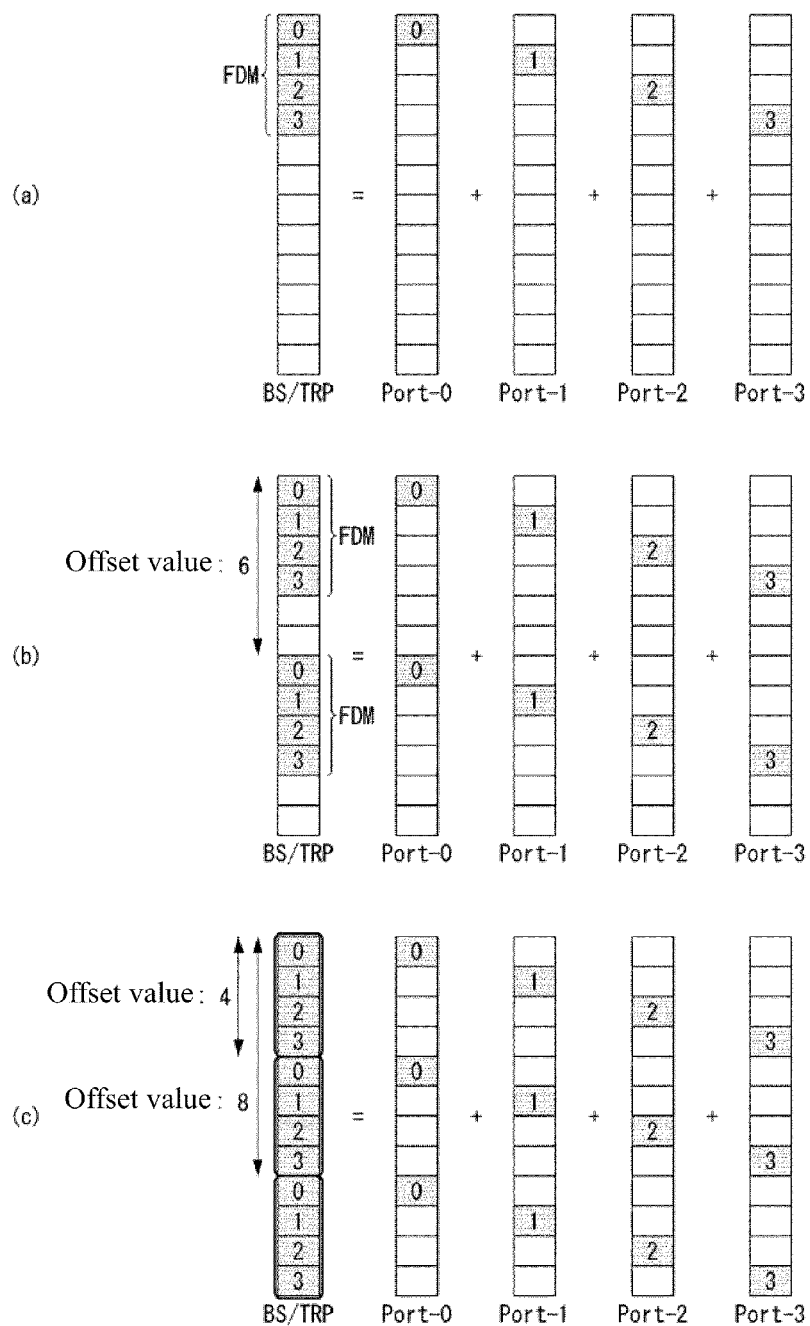
FIG. 13 is a diagram illustrating one example of a method for configuring a CSI-RS for beam management, which is transmitted through four antenna ports proposed in the present disclosure.

FIG. 13 is a diagram illustrating one example of a method for configuring a CSI-RS for beam management, which is transmitted through four antenna ports proposed in the present disclosure.

Referring to FIG. 13, four antenna ports for CSI-RS transmission for the CSI acquisition and the beam management may be configured with a specific density in a specific OFDM symbol.

Specifically, FIG. 13(a) illustrates a method for configuring four antenna ports for CSI-RS transmission once in one OFDM symbol. In other words, FIG. 13(a) illustrates one example of a case where the mapping pattern of the CSI-RS is component CSI-RS RE pattern (4,1).

When the CSI-RS for CSI-RS acquisition is configured using Component CSI-RS RE pattern (4,1), CDM4 (or FD-CDM2 of dividing the antenna ports into two CDM groups) may be used in the multiplexing method of the antenna port.

However, when the CSI-RS for the beam management is configured using Component CSI-RS RE pattern (4,1), the FDM may be used in the multiplexing method of the antenna port.

Since the CSI-RS for the beam management should be multiplexed with other signals in order to use the IFDMA as above, the CDM method is not used.

In this case, the frequency offset value of Component CSI-RS RE pattern (4,1) in FIG. 13(a) is '0', but may be configured to a different value.

The BS may announce to the UE through which mapping pattern (Component CSI-RS RE pattern) is configured through the higher layer signal.

For example, the BS may transmit to the UE the higher layer signaling including a parameter (e.g., ComponentCSI-RS_RE_Pattern configured as a specific pattern, etc.) indicating the mapping pattern of the CSI-RS for the beam management and the UE may recognize the mapping pattern of the CSI-RS through the parameter included in the higher layer signaling.

When the CSI-RS for the beam management and/or CSI acquisition is configured, the BS may not announce to the UE positional information of component CSI-RS RE indicating the CSI-RS mapped to the RE through the higher layer signaling.

In this case, the UE may recognize that the frequency offset value of Component CSI-RS RE pattern (4,1) is '0'. In other words, a default value of the frequency offset of Component CSI-RS RE pattern (4,1) may be configured to '0' and when a location value of the component CSI-RS is not transmitted through the higher layer signaling, the UE may recognize the frequency offset value as the default value.

The higher layer parameter (e.g., CDM length, etc.) may be configured to '0' in order to configure the CSI-RS for the beam management.

The BS may announce that the antenna ports are multiplexed without using the CDM method through the higher layer signaling and the UE may recognize that the CSI-RS is configured for the beam management in this case.

When the CSI-RS is configured as illustrated in FIG. 13(a), if the higher layer signaling includes the multiplexing information, the number of antenna ports, and the density information in spite of not including the frequency offset value, the UE may recognize that the CSI-RS is configured for the beam management.

Further, the UE may recognize that the offset value of Component CSI-RS RE pattern (4,1) is '0'.

When the large subcarrier spacing based CSI-RS for the beam management is configured or the CSI-RS for the CSI acquisition is configured, a plurality of antenna ports for CSI-RS transmission may be configured as two CDM group configured as FD-CDM or one CDM group configured as FD-CSM4.

FDM based port multiplexing may be performed for the CSI-RS for performing the beam management using the IFDMA as illustrated in FIG. 13(a).

When the CSI-RS is mapped as illustrated in FIG. 13(a), the UE may perform the beam sweeping operation using the receiving beam. In other words, the UE may perform a beam management procedure using a maximum of three beams.

However, when the number of antenna ports is 4 and the mapping density of the CSI-RS is ½, the UE may perform the beam management procedure using a maximum of 6 beams.

FIG. 13(b) illustrates a method for configuring four antenna ports for CSI-RS transmission twice in one OFDM symbol.

When the mapping pattern of the CSI-RS is Component CSI-RS RE pattern (4,1) and the CSI-RS is mapped with a density of 2, the CSI-RS may be configured as below.

The CSI-RS for the CSI acquisition may be configured as four FD-CDM2 groups or two FD-CDM4 groups. When the length of the CDM is configured to '2' or '4' in the higher layer signaling, the UE may recognize that the CSI-RS is configured for the CSI acquisition.

When the large subcarrier spacing based CSI-RS for the beam management is configured or the CSI-RS for the CSI acquisition is configured, the BS may configure four CDM groups configured as FD-CDM2 and configure four CDM groups configured as FD-CDM4.

Alternatively, the BS may configure two CDM groups configured as FD-CDM4.

For the CSI-RS for the IFDMA based beam management, port multiplexing may be configured based on FDM as illustrated in FIG. 13(b).

When the number of antenna ports for the CSI-RS transmission and the density information are transmitted to the UE through the higher layer signaling for the CSI-RS configuration, the UE may recognize that the CSI-RS for the IFDMA based beam management is configured.

Further, the UE may recognize that the frequency offset values of two Component CSI-RS RE pattern (4,1) are 0 and 6, respectively.

FIG. 13(c) illustrates a method for configuring four antenna ports for CSI-RS transmission three times in one OFDM symbol.

When the CSI-RS is transmitted on four antenna ports and respective CSI-RSs are mapped to one OFDM symbol by three, the CSI-RS for the beam management may be configured as illustrated in FIG. 13(c) without being multiplexed with other signals (e.g., a reference signal and/or a data signal).

When a RAN4 constraint in which a power of an RE to which the CSI-RS is mapped should be equal to or less than the power of the RE to which the PDSCH is mapped by four times, the power boosting gain in FIG. 13(c) may be acquired 3 times and 1.5 times more than those when the RE density of the CSI-RS is 1 and 2, respectively.

In this case, the CSI-RS may be configured as below.

When the BS announces that the number of antenna ports for transmitting the CSI-RS is '4' and the RE density is '3' through the higher layer signaling, the UE may recognize that the configured CSI-RS is the CSI-RS for the IFDMA based beam management.

Further, the UE may recognize that the frequency offset values of three component CSI-RS RE pattern (4,1) are '0', '4', and '8', respectively as illustrated in FIG. 13(c).

When the BS configures the CSI-RS for the large subcarrier spacing based beam management through the higher layer signaling, the BS may configure six CSM groups in which two adjacent REs constitute one FD-CDM2 or configure three CDM groups in which four REs constitute one FD-CDM4.

When the BS configures the CSI-RS for the IFDMA based beam management through the higher layer signaling, the BS may configure the antenna ports for transmitting the CSI-RS to be multiplexed based on FDM.

Figure 14:
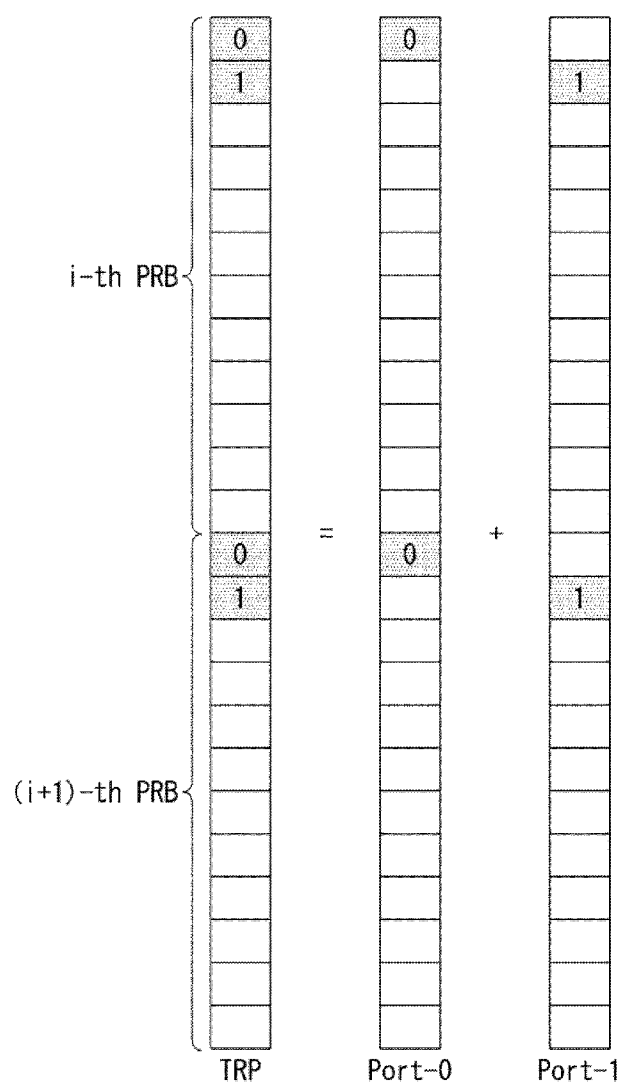
FIG. 14 is a diagram illustrating one example of a method for configuring a CSI-RS for beam management, which is transmitted through a plurality of antenna ports proposed in the present disclosure.

FIG. 14 is a diagram illustrating one example of a method for configuring a CSI-RS for beam management, which is transmitted through a plurality of antenna ports proposed in the present disclosure.

Referring to FIG. 14, when the CSI-RS is mapped to the adjacent REs on the frequency axis, the UE may perform the IFDMA based beam management by processing the CSI-RS transmitted from the BS.

When the adjacent REs on the frequency axis are configured (or allocated) as the CSI-RS RE as illustrated in FIG. 14, the UE may perform the beam management by performing the IFDMA based beam sweeping operation through additional signal processing.

In the present disclosure, it is assumed that when the IFDMA based beam management is performed, the antenna ports for the CSI-RS transmission are not multiplexed through CDM.

Hereinafter, a case where the number of antenna ports for the CSI-RS transmission is '2' as illustrated in FIG. 14 will be described as an example. However, this is just one example of the present disclosure and the present disclosure is not limited thereto and may be applied even in the case of the plurality of antenna ports.

Specifically, in the case of two PRBs in which the number of antenna ports for the CSI-RS transmission is '2' and the RE density of the CSI-RS is '2' as illustrated in FIG. 14, i.e., in a case where a 2-port CSI-RS signal is multiplexed and transmitted through the FDM scheme based on component CSI-RS RE pattern (2, 1), the UE may perform the beam sweeping operation by testing a maximum of six receiving beams.

In this case, at a specific time (n-th time slot (sub-time slot)) within one OFDM symbol duration, signals transmitted in antenna port index '0' (hereinafter, referred to as port-0) and antenna port index '1' (hereinafter, referred to as port-1) are defined as x(n) and z(n).

When it is assumed that there is no frequency offset value and the signal is transmitted every 12 subcarriers in port-0 and port-1 (repetition factor indicating repeated signal transmission is 12), time-axis signals x(n) and z(n) are may be shown in Equation 2 below.

$$x(n) = x_0 \text{ for } n = 0, 2, 4, \ldots, 22$$

$$x(n) = x_1, \text{ for } n = 1, 3, 5, \ldots, 23$$

$$z(n) = z_0 \text{ for } n = 0, 2, 4, \ldots, 22$$

$$z(n) = z_1 \text{ for } n = 1, 3, 5, \ldots, 23 \quad \text{[Equation 2]}$$

In this case, a transmitted CSI-RS on the time axis considering CSI-RS RE pattern frequency offset '1' mapped to port-1 as illustrated in FIG. 14 may be shown in Table 5 below.

TABLE 5

| | Sub-time unit(n) | | | | | | | | | | | | |
|---|---|---|---|---|---|---|---|---|---|---|---|---|---|
| | 0 | 1 | 2 | 3 | 4 | 5 | 6 | 7 | ... | 20 | 21 | 22 | 23 |
| Port-0 | $x_0$ | $x_1$ | $x_0$ | $x_1$ | $x_0$ | $x_1$ | $x_0$ | $x_1$ | | $x_0$ | $x_1$ | $x_0$ | $x_{10}$ |
| Port-1 | $z_0 e^{j(\alpha_0)}$ | $z_1 e^{j(\alpha_1)}$ | $z_0 e^{j(\alpha_2)}$ | $z_1 e^{j(\alpha_3)}$ | $z_0 e^{j(\alpha_4)}$ | $z_1 e^{j(\alpha_5)}$ | $z_0 e^{j(\alpha_6)}$ | $z_1 e^{j(\alpha_7)}$ | | $z_0 e^{j(\alpha_{20})}$ | $z_1 e^{j(\alpha_{21})}$ | $z_0 e^{j(\alpha_{22})}$ | $z_1 e^{j(\alpha_{23})}$ |

In the case of FIG. 14 and Table 5, two frequency-axis symbols (two symbols per antenna port) transmitted using two REs (subcarriers) during one OFDM symbol in port-0 and port-1 may be shown as below.

Port-0: $X_0$, $X_1$
Port-1: $Z_0$, $Z_1$

In this case, the signal on the frequency axis is represented by an uppercase letter and the signal on the time axis is represented by a lowercase letter.

Referring to Table 5, it can be seen that the same signal is repeatedly transmitted in respect to the signal transmitted in port-0, but a $e^{j(\alpha_n)}$ value is multiplied due to the frequency offset value in port-1, and as a result, different signals are transmitted every sub-time unit.

When a DFT (IDFT) size is 24 (N=24), the signal z(n) transmitted through port-1 on the time axis may be defined as shown in Equation 3 below.

$$z(n) = Z_0 \cdot \exp\left(\frac{j2\pi}{N} \times 0 \times n\right) + Z_1 \cdot \exp\left(\frac{j2\pi}{N} \times 12 \times n\right) \quad \text{[Equation 3]}$$
$$= Z_0 + Z_1 \cdot \exp(j\pi n)$$

In this case, a phase shift value $\alpha_n$ of the time axis signal due to the frequency offset value may be defined as shown in Equation 4 below.

$$\alpha_n = 2\pi \cdot \frac{n \cdot f_{off}}{24} \quad \text{[Equation 4]}$$

In Equation 4, $f_{off}$ represents the frequency offset value. FIG. 14 corresponds to a case of $f_{off} = 1$.

When the frequency offset value is considered, the signal $\bar{z}(n)$ transmitted in port-1 may be defined as shown in Equation 5 below.

$$\bar{z}(n) = Z_0 \cdot \exp\left(j\pi \cdot \frac{n}{12}\right) + Z_1 \cdot \exp\left(j\pi \cdot \frac{13n}{12}\right) \quad \text{[Equation 5]}$$
$$= (Z_0 + Z_1 \cdot \exp(j\pi n)) \cdot \exp\left(j\pi \cdot \frac{n}{12}\right)$$

Equations 3 to 5 may be used for the receiving beam sweeping operation for the beam management.

The UE already knows a rule in which the antenna port is mapped to the CSI-RS using Component CSI-RS pattern (2,1) and it is assumed that the maximum number of receiving beams is 6.

In other words, it is assumed that the UE already knows a rule (e.g., an ascending order or a descending order of the antenna port index) in which the antenna port is mapped to the RE for transmitting the CSI-RS.

Accordingly, the UE may already recognize that the CSI-RS REs allocated to port-0 and port-1 are illustrated in FIG. 14.

In this case, the receiving beam used for receiving the CSI-RS for the beam management to each sub-time unit n is shown in Table 6 below.

TABLE 6

| | Sub-time unit index (n) | | | | | |
|---|---|---|---|---|---|---|
| | 0-3 | 4-7 | 8-11 | 12-15 | 16-19 | 20-23 |
| Receiving beam index (at UE) | 1 | 2 | 3 | 4 | 5 | 6 |

Referring to Table 6, the UE receives CSI-RSs transmitted through sub-time unit indexes 0 to 3 using a first receiving beam and receives CSI-RSs transmitted through sub-time unit indexes 4 to 7 using a second receiving beam.

Referring to Tables 5 and 6, receiving signals in a time slot unit index n=1, 2, 3, 4 may be shown in Equation 6 below.

$$\begin{bmatrix} y(0) \\ y(1) \\ y(2) \\ y(3) \end{bmatrix} = \begin{bmatrix} h_0^1 x_0 + h_1^1 z_0 e^{j\alpha_0} \\ h_0^1 x_1 + h_1^1 z_1 e^{j\alpha_1} \\ h_0^1 x_0 + h_1^1 z_0 e^{j\alpha_2} \\ h_0^1 x_1 + h_1^1 z_1 e^{j\alpha_3} \end{bmatrix} + \begin{bmatrix} n(0) \\ n(1) \\ n(2) \\ n(3) \end{bmatrix} \quad \text{[Equation 6]}$$

In Equation 6, represents a complex symbol received in time slot n and represents a complex channel coefficient between a 'p'-th antenna port and a 'b'-th receiving beam on the time axis.

The UE switches the receiving beam every four time slots (sub-time unit). The UE subtracts signals in which the value of n is 0 and 1 from signals in which the value of n is 2 and 3 and removes a signal transmitted from port-0.

This may be shown in Equation 7 below from Equations 3 to 6.

$$y_{sub} = \begin{bmatrix} y(3) \\ y(2) \end{bmatrix} - \begin{bmatrix} y(1) \\ y(0) \end{bmatrix} = \begin{bmatrix} h_1^1(\tilde{z}(3) - \tilde{z}(1)) \\ h_1^1(\tilde{z}(2) - \tilde{z}(0)) \end{bmatrix} \quad \text{[Equation 7]}$$

$$= \begin{bmatrix} h_1^1(Z_0 + Z_1 \cdot \exp(j\pi)) \cdot \left(\exp\left(j\pi \cdot \frac{1}{4}\right) - \exp\left(j\pi \cdot \frac{1}{12}\right)\right) \\ h_1^1(Z_0 + Z_1) \cdot \left(\exp\left(j\pi \cdot \frac{1}{6}\right) - 1\right) \end{bmatrix}$$

$$= \begin{bmatrix} h_1^1 z_1 \cdot \left(\exp\left(j\pi \cdot \frac{1}{4}\right) - \exp\left(j\pi \cdot \frac{1}{12}\right)\right) \\ h_1^1 z_0 \cdot \left(\exp\left(j\pi \cdot \frac{1}{6}\right) - 1\right) \end{bmatrix}$$

$$= \underbrace{\begin{bmatrix} h_1^1 & 0 \\ 0 & h_1^1 \end{bmatrix} \begin{bmatrix} z_1 & 0 \\ 0 & z_1 \end{bmatrix}}_{(a)} \Phi$$

where $\Phi = \begin{bmatrix} \exp\left(j\pi \cdot \frac{1}{4}\right) - \exp\left(j\pi \cdot \frac{1}{12}\right) & 0 \\ 0 & \left(\exp\left(j\pi \cdot \frac{1}{6}\right) - 1\right) \end{bmatrix}$ In Equation 7, a noise signal is omitted. Since the UE recognizes that port-1 is mapped to an RE having a frequency offset value of '1', the UE may appoint and know that a matrix Φ in advance or calculate and know the matrix Φ through the higher layer signaling transmitted from the BS.

The UE may calculate a valid signal-to-noise ratio (SNR) by configuring a valid receiving signal transmitted in port-1 as shown in Equation 8 below.

$$\Phi^{-1} y_{sub} = \begin{bmatrix} h_1^{[1]} & 0 \\ 0 & h_1^{[1]} \end{bmatrix} \begin{bmatrix} z_1 & 0 \\ 0 & z_0 \end{bmatrix} \quad \text{[Equation 8]}$$

The UE may reconstruct the signal transmitted in port-0 based on a value calculated through Equation 8 and calculate a valid receiving signal-to-interference-noise-ratio (SINR) and/or SNR through the same method as port-1.

Since estimated information may be outdated information or the CSI-RS for the CSI acquisition may not be transmitted before the CSI-RS for the beam management, the UE may not know (a) indicating channel coefficient information.

The UE may first calculate a value of SNR and/or SINR from an antenna port of which an influence of interference is small for performance enhancement or the BS may transmit to the UE an order of an antenna port to calculate the value of SNR and/or SINR.

In this case, the BS may acquire from another BS or another UE information related to the order of the antenna port for the UE to calculate the value of SNR and/or SINR.

The signal transmitted in each antenna port is repeatedly transmitted twelve times, but the signal is transmitted through two adjacent REs on the frequency axis in two antenna ports, and as a result, the UE may perform the receiving beam sweeping operation through a total of six beams.

When the frequency offset value of port-1 is not '1' as illustrated in FIG. 14, a value of $f_{off}$ may be changed in Equation 5. Further, it is assumed that the frequency offset value of port-0 is '0', but even when the frequency offset value of port-0 is not '0', the beam management procedure may be performed through the IFDMA based beam sweeping operation using such a method.

When the frequency offset value of port-0 is not '0', a phase shift for the time axis signal of a transmitting signal transmitted in port-0 may be first compensated when each value of n is 0, 1, 2, and 3 and the signal transmitted in port-0 may become clean signals $x_0$ and $x_1$ without the phase shift and then Equations 6 to 8 may be performed.

In this case, in Equations 7 and 8, Φ may be changed to have phase shift information for the time axis signal transmitted in port-1 as an element.

Even when the density of the RE to which the CSI-RS is mapped is not '1', only the number of receiving beams for beam test may be changed and the method described above may be applied.

Accordingly, even when the density of the RE is ¼, ½, 2, and 3, the method described in the present disclosure may be applied.

When the number of antenna ports transmitting the CSI-RS is '2' and the density of the RE to which the CSI-RS is mapped is D, the beam management may be performed by performing the receiving beam sweeping operation for receiving beams as many as a maximum $\lfloor \frac{6}{D} \rfloor$.

In this case, RPF means a repetition factor indicating the number of times when the same signal is repeatedly transmitted.

When the number of antenna ports to which the CSI-RS is mapped is '4', the following method may be applied.

Hereinafter, a case where the density of the RE to which the CSI-RS is mapped is '1' and the CSI-RS is mapped as illustrated in FIG. 13(a) will be assumed and described. In other words, it is assumed that values of frequency offsets corresponding to port-0, port-1, port-2, and port-3 are 0, 1, 2, and 3, respectively and the maximum number of receiving beams is 3.

However, the method proposed in the present disclosure is not limited thereto and may be applied to various densities and mapping patterns.

The beam used for receiving the CSI-RS for the beam management in each sub-time unit n is shown in Table 7 below.

TABLE 7

| Sub-time unit index ($n$) | 0-7 | 8-15 | 16-23 |
|---|---|---|---|
| Receiving beam index (at UE) | 1 | 2 | 3 |

Time axis signals transmitted in four antenna ports may be shown in Table 8 below. In Table 8, $x_0$, $z_0$, $q_0$, $r_0$, $x_1$, $z_1$, $q_1$, and $r_1$ represent complex signals transmitted when there is no frequency offset value in antenna ports, respectively.

TABLE 8

| | Sub-time unit(n) | | | | | | | | | | | |
|---|---|---|---|---|---|---|---|---|---|---|---|---|
| | 0 | 1 | 2 | 3 | 4 | 5 | 6 | 7 | ... | 20 | 21 | 22 | 23 |
| Port-0 | $x_0$ | $x_1$ | $x_0$ | $x_1$ | $x_0$ | $x_1$ | $x_0$ | $x_1$ | | $x_0$ | $x_1$ | $x_0$ | $x_{10}$ |
| Port-1 | $z_0 e^{j(\alpha_0)}$ | $z_1 e^{j(\alpha_1)}$ | $z_0 e^{j(\alpha_2)}$ | $z_1 e^{j(\alpha_3)}$ | $z_0 e^{j(\alpha_4)}$ | $z_1 e^{j(\alpha_5)}$ | $z_0 e^{j(\alpha_6)}$ | $z_1 e^{j(\alpha_7)}$ | | $z_0 e^{j(\alpha_{20})}$ | $z_1 e^{j(\alpha_{21})}$ | $z_0 e^{j(\alpha_{22})}$ | $z_1 e^{j(\alpha_{23})}$ |
| Port-2 | $q_0 e^{j(\beta_0)}$ | $q_1 e^{j(\beta_1)}$ | $q_0 e^{j(\beta_2)}$ | $q_1 e^{j(\beta_3)}$ | $q_0 e^{j(\beta_4)}$ | $q_1 e^{j(\beta_5)}$ | $q_0 e^{j(\beta_6)}$ | $q_1 e^{j(\beta_7)}$ | | $q_0 e^{j(\beta_{20})}$ | $q_1 e^{j(\beta_{21})}$ | $q_0 e^{j(\beta_{22})}$ | $q_1 e^{j(\beta_{23})}$ |
| Port-3 | $r_0 e^{j(\gamma_0)}$ | $r_1 e^{j(\gamma_1)}$ | $r_0 e^{j(\gamma_2)}$ | $r_1 e^{j(\gamma_3)}$ | $r_0 e^{j(\gamma_4)}$ | $r_1 e^{j(\gamma_5)}$ | $r_0 e^{j(\gamma_6)}$ | $r_1 e^{j(\gamma_7)}$ | | $r_0 e^{j(\gamma_{20})}$ | $r_1 e^{j(\gamma_{21})}$ | $r_0 e^{j(\gamma_{22})}$ | $r_1 e^{j(\gamma_{23})}$ |

The receiving signal in a sub-time slot in which each value of n is 0, 2, 4, and 6 may be configured as shown in Equation 9 below.

[Equation 9]

$$\begin{bmatrix} y(0) \\ y(1) \\ y(2) \\ y(3) \end{bmatrix} = \underbrace{\begin{bmatrix} 1 & \exp(j\alpha_0) & \exp(j\beta_0) & \exp(j\gamma_0) \\ 1 & \exp(j\alpha_2) & \exp(j\beta_2) & \exp(j\gamma_2) \\ 1 & \exp(j\alpha_4) & \exp(j\beta_4) & \exp(j\gamma_4) \\ 1 & \exp(j\alpha_6) & \exp(j\beta_6) & \exp(j\gamma_6) \end{bmatrix}}_{(c)} \begin{bmatrix} h_0^1 \\ h_1^1 \\ h_2^1 \\ h_3^1 \end{bmatrix} \begin{bmatrix} x_0 \\ z_0 \\ q_0 \\ r_0 \end{bmatrix} + \begin{bmatrix} n(0) \\ n(1) \\ n(2) \\ n(3) \end{bmatrix}$$

where $\alpha_n = 2\pi \cdot \frac{n \cdot f_{off}^1}{N}$, $\beta_n = 2\pi \cdot \frac{n \cdot f_{off}^2}{N}$, $\gamma_n = 2\pi \cdot \frac{n \cdot f_{off}^3}{N}$ Since both $f_{off}^1 = 1$ and $f_{off}^2 = 2$, $f_{off}^3 = 3$ have different values as illustrated in FIG. 10(a), a rank of a matrix (c) of Equation 9 is 4.

As described in Equation 6, $h_p^b$ may mean a time axis channel coefficient between a receiving beam of a 'b'-th UE and a 'p'-th antenna port.

In Equation 9, since the UE may know (c) based on the offset value for each port recognized by the UE, the UE may calculate the valid receiving SNR and/or SINR for the complex signal transmitted for each port by multiplying each matrix in Equation 9 by an inverse matrix as shown in Equation 8.

Even when the value of n is 1, 3, 5, or 7, the UE may similarly calculate the valid SNR for $x_1$, $z_1$, $q_1$, and $r_1$ using the first receiving beam.

Accordingly, when there is no frequency offset, information transmitted in each antenna port is repeatedly transmitted twelve times, but the UE may perform the beam sweeping operation only a maximum of three times. In the case where the number of antenna ports is '4', the present disclosure may be effectively used when the density of the RE to which the CSI-RS is mapped is '1' or less.

When the number of antenna ports for the CSI-RS transmission is '4' and the density of the RE is 'D', the maximum number of receiving beams for which the UE may perform beam sweeping may become $\lfloor \frac{12}{4D} \rfloor$.

In the present disclosure, the method proposed in the present disclosure may be intuitively applied even to a random FFT size in the same principle.

Further, when the number of antenna ports is X, the density of the RE is D, and one PRB is constituted by K subcarriers, the maximum number of receiving beams which may be tested or swept by the UE may become $\lfloor \frac{K}{XD} \rfloor$.

In this case, D may have a value other than an integer and antenna port mapping of the CSI-RS may be performed by across PRB.

In the present disclosure, it is assumed that one PRB is constituted by 12 subcarriers. In other words, it is assumed that the value of K is 12.

The UE may announce to the BS a maximum beam sweeping capability which may be performed by the UE through a reporting procedure and the BS may determine or change a density value based on information acquired through the reporting procedure.

The BS may transmit to the UE at least one of CSI-RS type information, the number of antenna ports, or the density information through the CSI-RS configuration information of the higher layer signaling.

When the maximum number of receiving beams based on the CSI-RS configuration information is larger than the number of beam sweeping times desired by the UE, i.e., when the number of receiving beam sweeping times more than a value of $$\left\lfloor \frac{K}{XD} \right\rfloor$$

configured by the BS, the UE may request the BS that the maximum number of receiving beams is increased by considering a receiving signal quality and/or an interference environment.

Alternatively, when the maximum number $$\left\lfloor \frac{K}{XD} \right\rfloor$$

of receiving beams based on the CSI-RS configuration information is smaller than the number of beam sweeping times which may be performed by the UE or there is no difference in quality between different receiving beams, the UE may request the BS that the number of antenna ports for the configured CSI-RS transmission and/or the density of the antenna port are/is increased.

The UE may select a receiving beam having a highest quality through the receiving beam sweeping operation and announce to the BS information on antenna ports for transmitting the selected receiving beam and/or a preferred CSI-RS through a self-contained CQI channel described in FIG. 4 or a time and/or frequency resource secured for uplink signal transmission included in the same PRB as the symbol in which the CSI-RS is transmitted (or included in an adjacent slot and/or subframe).

Therefore, the UE and the BS may rapidly use a result of beam sweeping.

Figure 15:
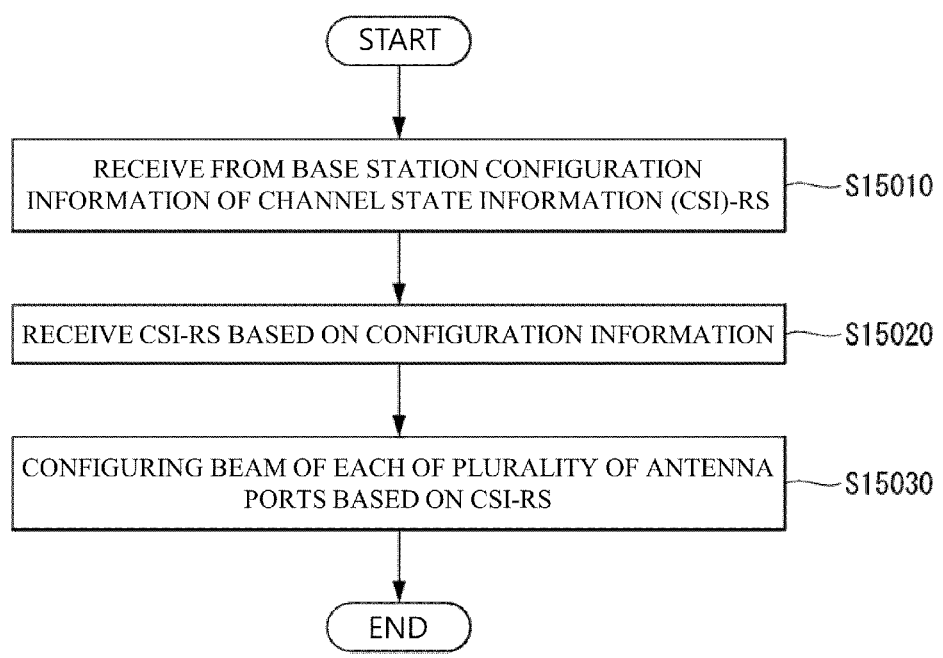
FIG. 15 is a diagram illustrating one example of a method for performing beam management through CSI-RSs transmitted through a plurality of antenna ports by the UE proposed in the present disclosure.

FIG. 15 is a diagram illustrating one example of a method for performing beam management through CSI-RSs transmitted through a plurality of antenna ports by the UE proposed in the present disclosure.

Referring to FIG. 15, the UE receives from the BS configuration information of a Channel State Information (CSI)-RS of a higher layer signaling (S15010).

As described in FIGS. 9 to 14, the configuration information of the CSI-RS may include at least one of the CSI-RS type information indicating whether the CSI-RS transmitted through the higher layer signaling is used for the CSI acquisition or beam management, multiplexing information indicating that the antenna ports are multiplexed using the FDM scheme without using the CDM scheme, density information of the RE to which the CSI-RS is mapped, the number of antenna ports in which the CSI-RS is transmitted, or mapping patter information (component CSI-RS RE pattern (2,1)) in which the CSI-RS is mapped to the RE.

Thereafter, the UE receives the CSI-RS based on the configuration information (S15020). In this case, the CSI-RS may be transmitted through a plurality of antenna ports.

Thereafter, the UE configures a beam of each of the plurality of antenna ports based on the CSI-RS (S15030).

The CSI-RS is mapped a subcarrier on a frequency axis at an interval of resource elements (REs) of a predetermined number and the CSI-RS is repeatedly transmitted at the interval of resource elements (REs) of a predetermined number within a specific time interval.

The UE processes the received CSI-RS through the method described in FIG. 14 to perform the beam sweeping operation through the receiving beam.

The UE may perform a beam management procedure by selecting a receiving beam having a highest quality through the receiving beam sweeping operation.

Overview of Devices to which Present Disclosure is Applicable

Figure 16:
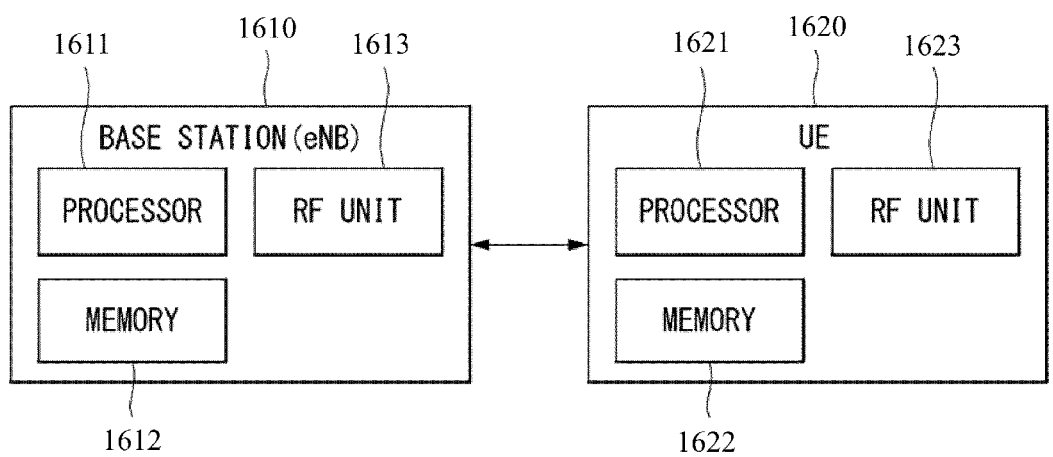
FIG. 16 illustrates a block diagram of a wireless communication device to which methods proposed in the present disclosure may be applied.

FIG. 16 illustrates a block diagram of a wireless communication device to which methods proposed in the present disclosure may be applied.

Referring to FIG. 16, a wireless communication system includes an eNB 1610 and multiple UEs 1610 positioned within an area of the eNB 1620.

Each of the eNB and the UE may be expressed as a wireless device.

The eNB 1610 includes a processor 1611, a memory 1612, and a radio frequency (RF) module 1613. The processor 1611 implements a function, a process, and/or a method which are proposed in FIGS. 1 to 12 above. Layers of a radio interface protocol may be implemented by the processor. The memory 1612 is connected with the processor to store various information for driving the processor. The RF module 1613 is connected with the processor to transmit and/or receive a radio signal.

The UE 1620 includes a processor 1621, a memory 1622, and an RF module 1623.

The processor 1621 implements a function, a process, and/or a method which are proposed in FIGS. 1 to 12 above. Layers of a radio interface protocol may be implemented by the processor. The memory 1622 is connected with the processor to store various information for driving the processor. The RF module 1623 is connected with the processor to transmit and/or receive a radio signal.

The memories 1612 and 1622 may be positioned inside or outside the processors 1611 and 1621 and connected with the processors 1611 and 1621 by various well-known means.

Further, the eNB 1610 and/or the UE 1620 may have a single antenna or multiple antennas.

Figure 17:
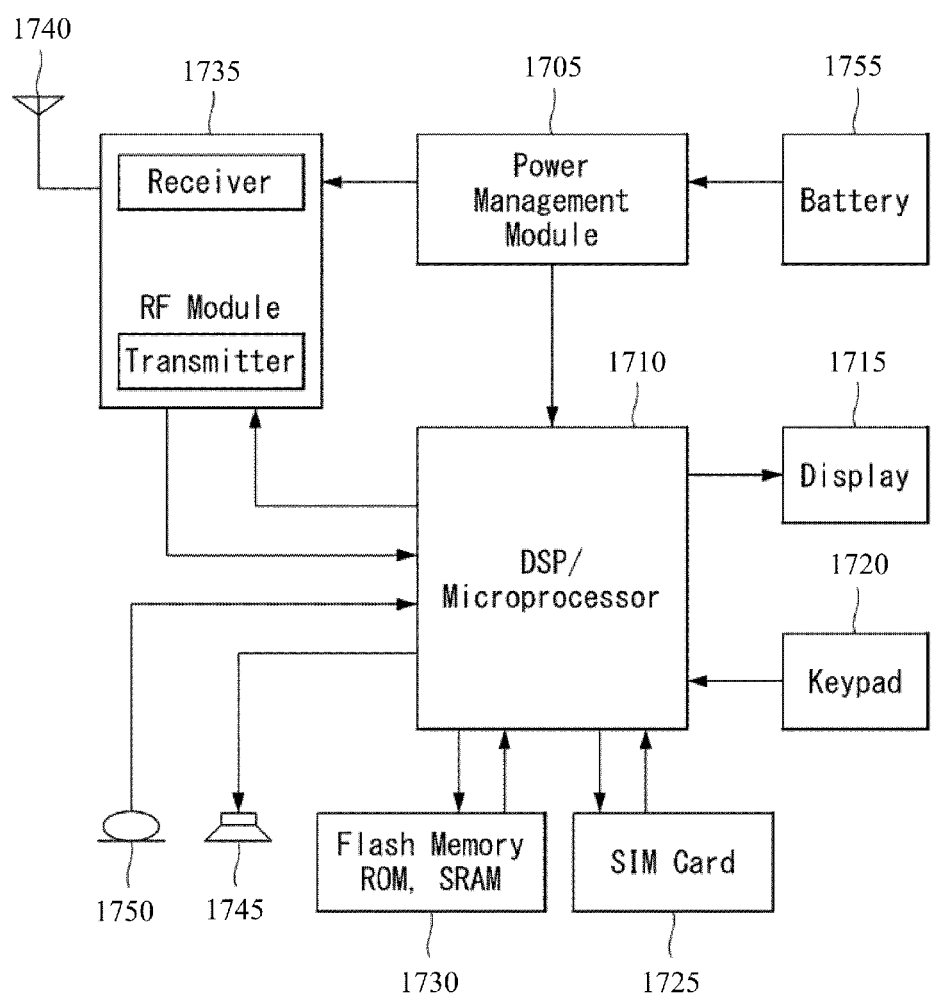
FIG. 17 is a block diagram of a communication device according to an embodiment of the present disclosure.

FIG. 17 is a block diagram of a communication device according to an embodiment of the present disclosure.

In particular, FIG. 17 is a diagram more specifically illustrating the UE of FIG. 16 above.

Referring to FIG. 17, the UE may be configured to include a processor (or a digital signal processor (DSP)) 1710, an RF module (or RF unit) 1735, a power management module 1705, an antenna 1740, a battery 1755, a display 1715, a keypad 1720, a memory 1730, a subscriber identification module (SIM) card 1725 (This component is optional), a speaker 1745, and a microphone 1750. The UE may also include a single antenna or multiple antennas.

The processor 1710 implements a function, a process, and/or a method which are proposed in FIGS. 9 to 15 above. The layers of the radio interface protocol may be implemented by the processor.

The memory 1730 is connected with the processor and stores information related with an operation of the processor. The memory 1730 may be positioned inside or outside the processor and connected with the processor by various well-known means.

A user inputs command information such as a telephone number or the like by, for example, pressing (or touching) a button on the keypad 1720 or by voice activation using the microphone 1750. The processor receives such command information and processes to perform appropriate functions including dialing a telephone number. Operational data may be extracted from the SIM card 1725 or the memory 1730. In addition, the processor may display command information or drive information on the display 1715 for the user to recognize and for convenience.

The RF module 1735 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 1740 functions to transmit and receive the wireless signals. Upon receiving the radio signals, the RF module may transfer the signal for processing by the processor and convert the signal to a baseband. The processed signal may be converted into to audible or readable information output via the speaker 1745.

Figure 18:
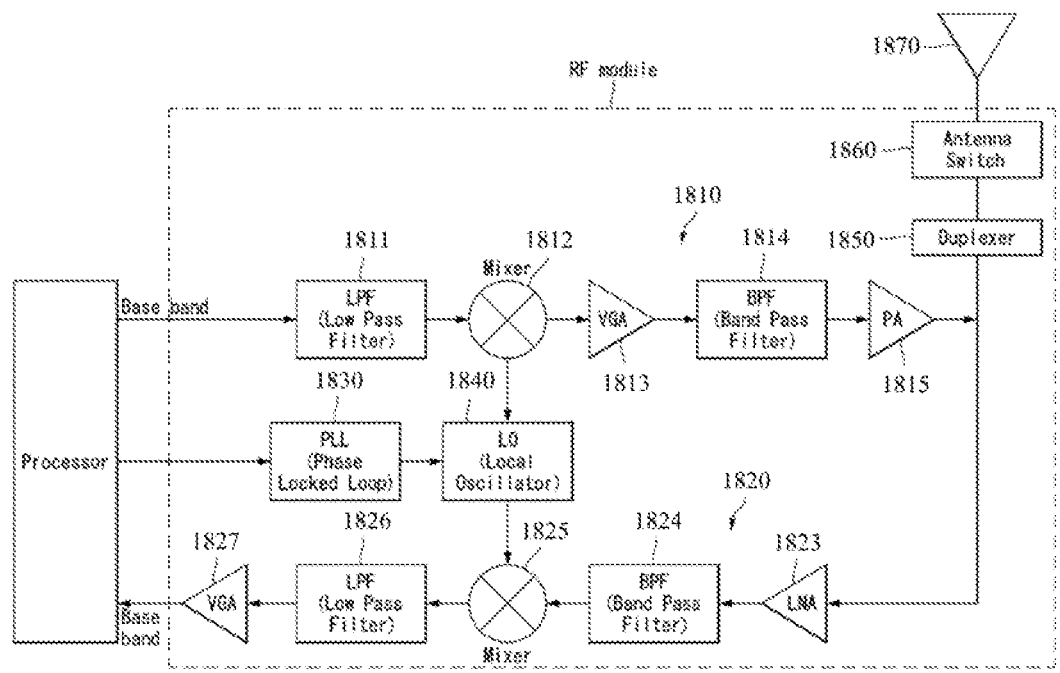
FIG. 18 is a diagram illustrating one example of an RF module of a wireless communication device to which a method proposed in the present disclosure may be applied.

FIG. 18 is a diagram illustrating one example of an RF module of a wireless communication device to which a method proposed in the present disclosure may be applied.

Specifically, FIG. 18 illustrates an example of an RF module that may be implemented in a frequency division duplex (FDD) system.

First, in a transmission path, the processors described in FIGS. 16 and 17 process the data to be transmitted and provide an analog output signal to the transmitter 1810.

Within the transmitter 1810, the analog output signal is filtered by a low pass filter (LPF) 1811 to remove images caused by a digital-to-analog conversion (ADC) and up-converted to an RF from a baseband by an up-converter (mixer) 1812, and amplified by a variable gain amplifier (VGA) 1813 and the amplified signal is filtered by a filter 1814, additionally amplified by a power amplifier (PA) 1815, routed through a duplexer(s) 1850/an antenna switch(es) 1860, and transmitted through an antenna 1870.

In addition, in a reception path, the antenna 1870 receives signals from the outside and provides the received signals, which are routed through the antenna switch(es) 1860/duplexers 1850 and provided to a receiver 1820.

In the receiver 1820, the received signals are amplified by a low noise amplifier (LNA) 1823, filtered by a bans pass filter 1824, and down-converted from the RF to the baseband by a down-converter (mixer) 1825.

The down-converted signal is filtered by a low pass filter (LPF) 1826 and amplified by a VGA 1827 to obtain an analog input signal, which is provided to the processors described in FIGS. 16 and 17.

Further, a local oscillator (LO) generator 1840 also provides transmitted and received LO signals to the up-converter 1812 and the down-converter 1825, respectively.

In addition, a phase locked loop (PLL) 1830 receives control information from the processor to generate the transmitted and received LO signals at appropriate frequencies and provides control signals to the LO generator 1840.

Further, circuits illustrated in FIG. 18 may be arranged differently from the components illustrated in FIG. 18.

Figure 19:
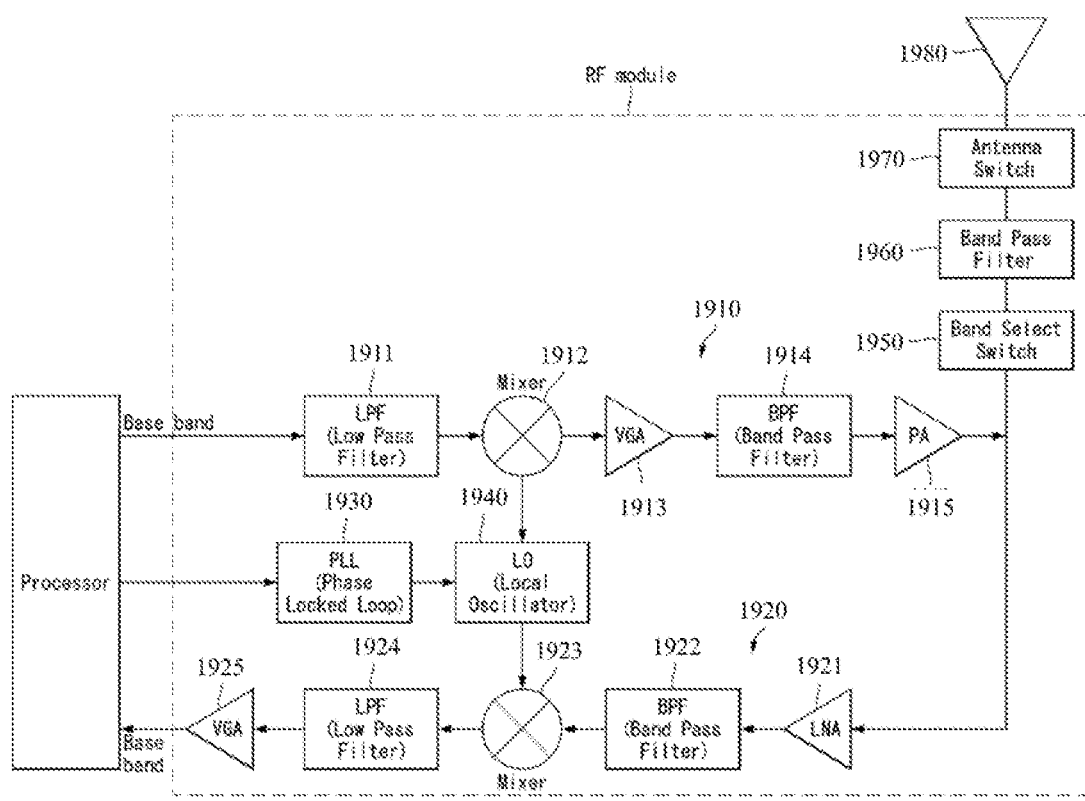
FIG. 19 is a diagram illustrating another example of the RF module of the wireless communication device to which the method proposed in the present specification may be applied.

FIG. 19 is a diagram illustrating another example of the RF module of the wireless communication device to which the method proposed in the present specification may be applied.

Specifically, FIG. 19 illustrates an example of an RF module that may be implemented in a time division duplex (TDD) system.

A transmitter 1910 and a receiver 1920 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 18.

A signal amplified by a power amplifier (PA) 1915 of the transmitter is routed through a band select switch 1950, a band pass filter (BPF) 1960, and an antenna switch(es) 1970 and transmitted via an antenna 1980.

In addition, in a reception path, the antenna 1980 receives signals from the outside and provides the received signals, which are routed through the antenna switch(es) 1970, the band pass filter 1960, and the band select switch 1950 and provided to the receiver 1920.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Although the beam management method in the wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:

1. A method of beam management of a terminal in a wireless communication system, comprising:
   receiving configuration information of Channel State Information (CSI)-RS from a base station;
   receiving the CSI-RS based on the configuration information, the CSI-RS is transmitted through a plurality of antenna ports; and
   configuring a beam of each of the plurality of antenna ports based on the CSI-RS,
   wherein the CSI-RS is mapped a subcarrier on a frequency axis at an interval of a predetermined number of resource elements (REs),
   wherein the CSI-RS is repeatedly transmitted at the interval of the predetermined number of resource elements (REs) within a specific time interval,
   wherein the CSI-RS is repeatedly transmitted through a plurality of beams,
   wherein the configuring of the beam includes:
   reconstructing a CSI-RS transmitted in a specific antenna port among the plurality of antenna ports using a CSI-RS repeatedly received through a specific beam among the plurality of beams,
   calculating a reception signal-to-interference-noise-ratio (SINR) and/or signal-to-noise ratio (SNR) through the reconstructed CSI-RS, and
   performing a beam sweeping operation for beam configuration through the plurality of beams based on the reception SINR and/or SNR.

2. The method of claim 1, wherein the number of beam sweeping operations is determined based on the number of subcarriers included in a physical resource block (PRB), the number of the plurality of antenna ports, and the number of resource elements to which the CSI-RS is mapped.

3. The method of claim 2, wherein the number of beam sweeping operations is smaller than the number of resource elements.

4. The method of claim 2, wherein when the number of subcarriers included in the physical resource block (RPB) is K, the number of the plurality of antenna ports is X, and the number of resource elements to which the CSI-RS is mapped is D, the number of beam sweeping operations is $$\left\lfloor \frac{K}{XD} \right\rfloor.$$

5. The method of claim 1, wherein the configuring of the beam further includes when a frequency offset of the specific antenna port is not '0', compensating phase shift on a time axis in the CSI-RS.

6. The method of claim 1, wherein the configuration information includes at least one of CSI-RS type information indicating a type of CSI-RS, Code Division Multiplexing (CDM) type information depending on the type information, density information of the REs to which the CSI-RS is mapped, information on the number of the plurality of antenna ports, or pattern information in which the CSI-RS is mapped.

7. The method of claim 1, wherein the terminal previously recognizes a mapping rule indicating an order in which the CSI-RS is mapped to the resource element.

8. The method of claim 1, wherein a beam is configured according to an order of an antenna port having low interference among the plurality of antenna ports or an order of the CSI-RS transmitted from the base station.

9. A terminal performing beam management in a wireless communication system, the terminal comprising:
   a radio frequency (RF) module transmitting and receiving a radio signal; and
   a processor controlling the RF module,
   wherein the processor is configured to:
   receive configuration information of Channel State Information (CSI)-RS from a base station,
   receive the CSI-RS based on the configuration information, wherein the CSI-RS is transmitted through a plurality of antenna ports, and
   configure a beam of each of the plurality of antenna ports based on the CSI-RS,
   wherein the CSI-RS is mapped a subcarrier on a frequency axis at an interval of resource elements (REs) of a predetermined number,
   wherein the CSI-RS is repeatedly transmitted at the interval of the predetermined number of resource elements (REs) within a specific time interval,
   wherein the CSI-RS is repeatedly transmitted through a plurality of beams,
   wherein, in the configuring of the beam, the processor is configured to:
   reconstruct a CSI-RS transmitted in a specific antenna port among the plurality of antenna ports using a CSI-RS repeatedly received through a specific beam among the plurality of beams,
   calculate a reception signal-to-interference-noise-ratio (SINR) and/or signal-to-noise ratio (SNR) through the reconstructed CSI-RS, and
   perform a beam sweeping operation for beam configuration through the plurality of beams based on the reception SINR and/or SNR.

* * * * *